United States Patent [19]
Chang et al.

[11] 3,810,121
[45] May 7, 1974

[54] TIMING GENERATOR CIRCUIT FOR CENTRAL DATA PROCESSOR OF DIGITAL COMMUNICATION SYSTEM

[75] Inventors: Gregory I. Chang, Oak Park; Rolfe E. Buhrke, La Grange Park; Verner K. Rice, Wheaton; John J. Mele, Chicago, all of Ill.

[73] Assignee: GTE Automatic Electric Laboratories Incorporated, Northlake, Ill.

[22] Filed: Apr. 23, 1973

[21] Appl. No.: 353,915

[52] U.S. Cl. .............................................. 340/172.5
[51] Int. Cl. .............................................. G06f 1/04
[58] Field of Search ................. 340/172.5, 146.1 BE

[56] References Cited

UNITED STATES PATENTS 3,715,729 2/1973 Mercy .............................. 340/172.5

*Primary Examiner*—Raulfe B. Zache
*Attorney, Agent, or Firm*—B. E. Franz

[57] ABSTRACT

Central data processors are provided in duplicate for a digital communication system. Each processor has its own timing generator circuits; circuits are arranged so that the one in the active central processor generates place and accept levels for both central processors. Circuitry is disclosed for switching timing generators when central processors are switched between active and passive. Circuitry also turns off the standby central processor under hardware or software control and sets up the standby when it has been determined that a switch will be necessary.

7 Claims, 23 Drawing Figures

TIMING GENERATOR CIRCUIT

PROCESSOR CONTROL CIRCUIT (PCC)

INPUT OUTPUT CIRCUIT

PATENTED MAY 7 1974 3,810,121

SHEET 10 OF 12

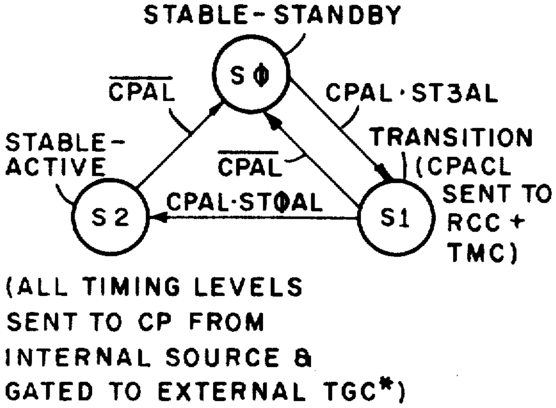

Fig. 17

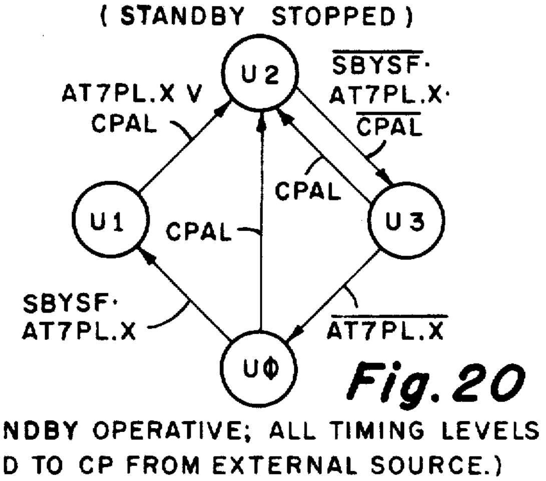

Fig. 20

| | | | | | | | | | |
|---|---|---|---|---|---|---|---|---|---|
| ST3AL | | 0 | 1 | 1 | 0 | 0 | 1 | 1 | 0 |
| STΦAL | | 0 | 0 | 1 | 1 | 1 | 1 | 0 | 0 |
| CPAL | | 0 | 0 | 0 | 0 | 1 | 1 | 1 | 1 |
| Y3F | Y4F | | | | | | | | |
| 0 | 0 | (SΦ) | (SΦ) | (SΦ) | (SΦ) | (SΦ) | S1 | S1 | (SΦ) |
| 0 | 1 | SΦ | SΦ | SΦ | SΦ | S2 | (S1) | (S1) | (S1) |
| 1 | 1 | SΦ | SΦ | SΦ | SΦ | (S2) | (S2) | (S2) | (S2) |
| 1 | 0 | SΦ | SΦ | SΦ | SΦ | (S2) | (S2) | (S2) | (S2) |

$Y3F = Y3F \cdot CPAL \vee Y4F \cdot ST\Phi AL \cdot CPAL \cdot \overline{ST3AL}$ $Y4F = Y4F \cdot CPAL \vee \overline{Y3F} \cdot ST3AL \cdot CPAL$ $CPACL = \overline{Y3F} \cdot Y4F$

Fig. 18

| | | | | | | |
|---|---|---|---|---|---|---|
| CPAL | | 0 | 0 | 0 | 0 | 1 |
| AT7PL.X | | 0 | 1 | 1 | 0 | – |
| SBYSF | | 0 | 0 | 1 | 1 | – |
| Y1F | Y2F | | | | | |
| 0 | 0 | (UΦ) | (UΦ) | U1 | (UΦ) | U2 |
| 0 | 1 | U2 | UΦ | (U1) | U2 | U2 |
| 1 | 1 | (U2) | U3 | (U2) | (U2) | (U2) |
| 1 | 0 | UΦ | (U3) | U2 | UΦ | U2 |

$Y1F = Y1F \cdot [AT7PL.X \vee Y2F] \vee Y2F \cdot \overline{AT7PL.X} \vee CPAL$ $Y2F = Y2F \cdot [AT7PL.X \vee SBYSF] \vee AT7PL.X \cdot SBYSF \vee CPAL$ $ITCCL = Y1F \cdot \overline{Y2F}$

Fig. 21

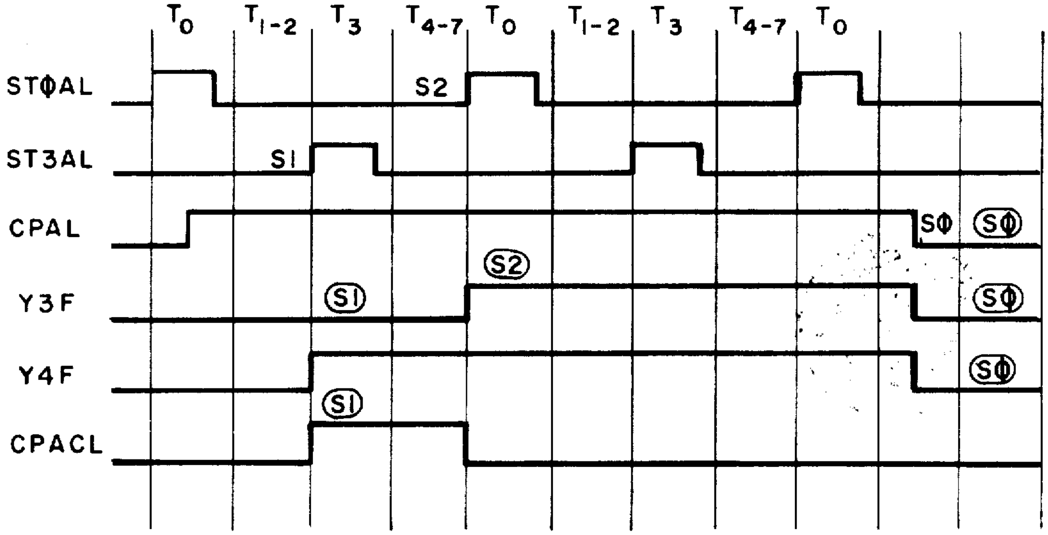

Fig. 19

TIMING GENERATOR CIRCUIT FOR CENTRAL DATA PROCESSOR OF DIGITAL COMMUNICATION SYSTEM

BACKGROUND AND SUMMARY

The present invention relates to a timing generator for a data processing system used in connection with a digital communication system. The system has duplicate copies of central processors and storage means for obtaining higher reliability; and circuits are provided, upon the detection of a fault in one of these units, for reconfiguring the combination so as to provide an active copy of central processor and primary storage means which is operative and capable of performing the required functions. The central processors may be used to control a Traffic Service Position System (TSPS) telephone network.

The invention will be described in connection with a particular system as disclosed in the following copending, co-owned applications: (1) Brenski, et al., application for "Control Complex for TSPS Telephone System," Ser. No. 289,718, filed Sept. 15, 1972; (2) Schulte, et al., application for "Maintenance Access Circuit for Central Processor of Digital Communication System," filed Jan. 2, 1973, Ser. No. 320,020; (3) Wilbur, et al., application for "System for Reconfiguring Central Processor and Instruction Storage Combinations," Ser. No. 341,428; filed Mar. 15, 1973; and (4) Wilbur, et al. application for "Recovery Control Circuit for Central Processor Digital Communication System," Ser. No. 341,427, filed Mar. 15, 1973. The subject matter of these applications are incorporated herein by reference.

Briefly, the present invention is concerned with the circuitry which generates the timing levels or signals for the system.

There are two Timing Generator Circuits (TGC), one in each Central Processor. The Timing Generator Circuit in the active Central Processor (CP) supplies the timing levels for both the active CP and the standby CP. The TGC in the standby does not transmit levels to either CP complex. The timing levels received by the standby CP from the active, can be inhibited by the active CP upon hardware or software request. Inhibiting the timing levels in effect turns off the standby CP. When the inhibit is removed, both the active and the standby CP will be operating in the same timing interval. In addition, each timing level in the standby CP can be controlled individually for diagnostic purposes.

The two Timing Generator Circuit clocks do not run in synchronization. When the CP status is reversed, (active becomes standby, standby becomes active) special action is taken to avoid problems in the system due to the switch of the source of the timing levels. The TGC in the newly active CP will not start transmission of timing levels to either machine for at least 2 microseconds after the switch, allowing the communications buses to settle down. The first level to be transmitted to both CP's will be the start of a new machine cycle. During the switching operation, the TGC in the newly activated CP notifies its Recovery Control Circuit (RCC) that a reversal of CP status has occurred, which requests a System Recovery Program to be run in order to determine the sanity of the new active CP. The TGC also notifies the Timing Monitor Circuit (TMC) that the Timing Level Check Circuit in the TMC should be initialized in order to check the correct sequences of the timing levels generated by the TGC in the active CP.

THE DRAWING

FIG. 17 is a state diagram of the Activity Control Circuit of the Timing Generator Circuit;

FIG. 18 is a sequential flow table for the Activity Control Circuit;

FIG. 19 is a timing diagram showing the switching sequence of the Activity Control Circuit;

FIG. 20 is a state diagram of the Stop Standby Control Circuit;

FIG. 21 is a flow table for the Stop Standby Control Circuit;

DETAILED DESCRIPTION

I. INTRODUCTION—TSPS

Figure 1:
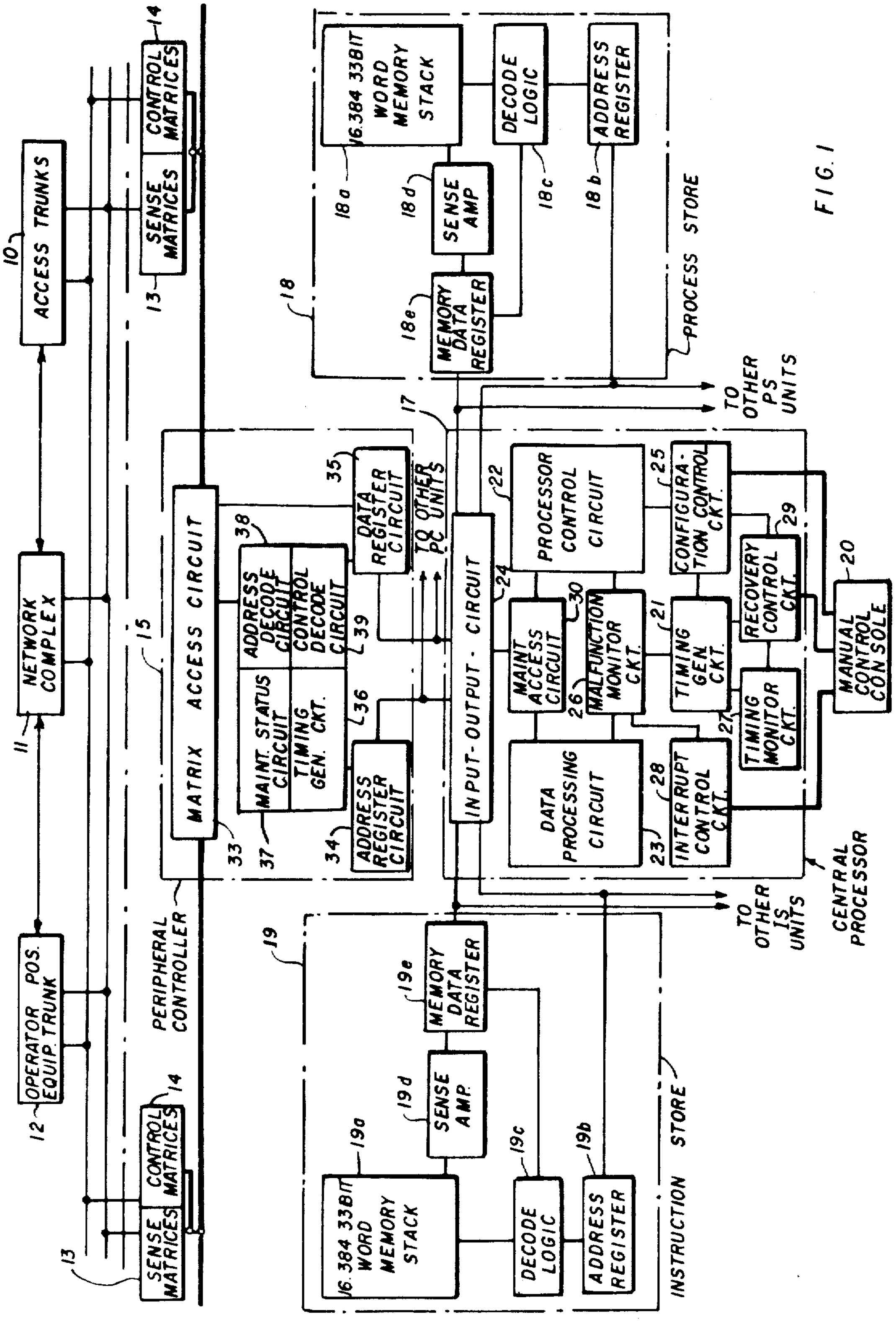
FIG. 1 is a functional block diagram of a TSPS System, including a Control and Maintenance Complex.

The primary function of the Total Service Position System (TSPS) is to provide data processor control of the various functions in toll calls which in the past have been performed by operators but have not required the exercise of discretion on the part of the operator. At the same time, the system must permit operator intervention, as required. Thus, various trunks from an end office to a toll center pass through the TSPS System, and these are commonly referred to as Access Trunks, functionally illustrated in FIG. 1 by the block 10.

The access trunks 10 are connected to and pass through access trunk circuits in a network complex 11 which is physically located at the same location as the TSPS base unit, and the network complex 11 permits the system to access each individual trunk line to open it or control it, or to signal in either direction. There is no switching or re-routing of trunks or calls at this location. Each trunk originating at a particular end office is permanently wired to a single termination in a remote toll office while passing through a TSPS network complex or trunk circuit en route.

The various access trunks may originate at different end offices, but regardless of origin, they are served in common by the TSPS System and the operators and traffic office facilities associated with that system. Hence, the equipment interfaces with various auxiliary equipment incidental to gaining access to the throughput access trunks, including remote operator positions, equipment trunks, magnetic tape equipment for recording charges, and various other equipment diagrammatically illustrated by the block 12. Additional details regarding the network complex 11 and the auxiliary equipment and communication lines 12 for a TSPS System may be obtained from the *Bell System Technical Journal* of December, 1970, Vol. 49, No. 10.

The present invention is more particularly directed to one aspect of the data processor which controls the telephony—namely the timing circuitry in the Central Processor (CP) which controls the systems and performs call processing as well as maintenance and recovery functions. The Central Processor is shown in simplex form within the chain block 17 of FIG. 1.

It will be observed that the telephony equipment is about three orders of magnitude in time slower, on the average, than is necessary to execute individual instructions in modern high-speed digital computers. For example, for the present system a clock increment for the Central Processor is 4 microseconds whereas the trunk circuits are sampled every 10 milliseconds. Hence many functions can be performed in the Central Processor, including internal and external maintenance, table look-ups, computations, monitoring of different access trunks, system recovery from a detected fault, etc. between the expected changes in a given trunk.

The TSPS System uses a stored program control as a means of attaining flexibility for varied operating conditions. Reliability is attained by duplicating hardware wherever possible. A stored program control system consists of memories for instructions and data and a processing unit which performs operations, dictated by the stored instructions, to monitor and control peripheral equipment.

A Control and Maintenance Complex (CMC) contains the Instruction Store Complex (IS*), Process Store Complex (PS*), Peripheral Unit Complex (PC*), and the Central Processor Complex (CP*). The asterisk designates all of the circuitry associated with a complex, including the duplicate copy, if applicable.

The interface between the telephony equipment and the data processor is the Peripheral Unit Complex which includes a number of sense matrices 13 and control matrices 14 together with a Peripheral Controller (PC) diagrammatically indicated by the chain block 15.

The principal elements of the data processing circuitry include the Central Processor (CP) 17, a Process Store (PS) enclosed within the chain block 18, and an Instruction Store (IS) enclosed within the chain block 19. A computer operator or maintenance man may gain manual access into the Central Processor 17 by means of a manual control console 20, if desired or necessary.

The Instruction Store (IS) 19 which consists of two copies, contains the stored programs. Each copy has up to eight units as shown in block 19 and includes two types of memory:

1. A read-only unit 19*a* containing a maximum of 16,384 thirty-three bit words.
2. Core Memory in remaining units containing a maximum of seven units of 16,384 thirty-three bit words per unit. Individual words are read from or written into IS by CP 17, as will be more fully described below.

Each IS unit 19 of the eight possible is similar; and they are of conventional design including an Address Register 19*b* receiving digital signals representative of a particular word desired to be accessed (for reading or writing as the case may be). This data is decoded in the Decode Logic Circuit 19*c;* and the recovered data is sensed by sense amplifiers 19*d* and buffered in a Memory Data Register 19*e* which also communicates with the Central Processor 17.

The Process Store (PS) 18 contains call processing data generated by the program. The PS (also in duplicate copies) comprises Core Memory units 18*a* containing a maximum of eight units of 16,384 thirty-three bit words for each copy. Individual words are read from or written into PS by CP in a manner similar to the accessing of the Instruction Store 19, just described. That is, an Address Register 18*b* receives the signals representative of a particular location desired to be accessed; and this information is decoded in a conventional Decode Logic Circuit 18*c*. The recovered information is sensed by sense amplifiers 18*d* and buffered in Memory Data Register 18*e*.

The CMC communicates with the telephony and switching equipment through matrices 13, 14 of sense and control devices. Any number of known design elements will work insofar as the instant invention is concerned. The sense and control matrices 13, 14 are each organized into 32 bit sense words and 32 bit control words. On command of CP, PC samples a sense word and returns the values of the 32 sense points to CP. Each control point is a bistable switch or device. To control telephone and input/output equipment, CP sets a word of control points through PC. PC together with the sense and control matrices comprise the Peripheral Unit Complex (PU).

CP sequentially reads and executes instructions which comprise the program from IS. The CP reads and executes most instructions in 4 microseconds (one machine cycle time). Those instructions that access IS require 8 microseconds require two machine cycles to be executed and are referred to as "dual cycle" instructions.

The instructions obtained from the IS can be considered "Directives" to the CP specifying that it is to perform one of the following operations:

a. Change and/or transfer information inside the CP in accordance with some fixed rule.

b. Communicate with the IS or PS by requesting the IS/PS to either;

1. Read a 33 bit word from a specified location, or
2. Write a 33 bit word into a specified location.

c. Communicate with the PC by requesting PC to either;

1. Read a specified 32 bit from sense point word, or

2. Write into a specified 32 bit control point word.

d. Perform maintenance operations internal to CP by either;

1. Reading from a maintenance sense group, or

2. Writing into a maintenance control group.

The complete description of all instruction words is given in the first of the above-identified applications.

The Control and Maintenance complex may be viewed from two levels: a processing level and a maintenance level. At the processing level (which includes the control and maintenance of the telephone equipment) the CMC appears to be an unduplicated, single processor system as in FIG. 1. At the maintenance level (which here refers only to CMC maintenance) the CMC consists of duplicated copies of the units in each complex, as seen in FIG. 2.

The duplication within the CMC is provided for three purposes:

1. In the event that a failed unit is placed out-of-service, its copy provides continued operation of the CMC.

2. Matching between copies provides the primary means of detecting failures.

3. In-service units can be used to diagnose an out-of-service unit and report the diagnostic results.

Each complex within the CMC may be reconfigured (with respect to in-service and out-of-service units) independently of the other complexes to provide higher overall CMC reliability.

The CMC operation is monitored by internal checking hardware. In the event of a malfunction (misbehavior due either to noise or to failure), the CP is forced into the execution of a recovery program by a maintenance interrupt.

When the malfunction is due to failure, the recovery program will find the failed copy and place it out-of-service. When at least one complete set of units in each complex can be placed in-service, the fault recovery program will terminate after reconfiguring the CMC to an operational system. If a good set of units in each complex cannot be found, the fault recovery program continues until manual intervention occurs.

To facilitate the recovery operation, a hierarchy of in-service copies are defined:

1. One Central Processor must always be in the active state, only the active CP can change the configuration of the CMC, 2. If the other CP is in-service, that CP is the standby CP, and 3. The in-service copies of Instruction Store, Process Store, and Peripheral Control Units are designated as primary and secondary where the primary copies are associated with the active CP.

Each Peripheral Control Unit may also be designated as active or standby; only the active Peripheral Control Unit controls telephone equipment through the sense and control points. Further, the duplicate copies of IS are designated active and standby according to which one (called the "active" one) is associated with the primary CP.

II. THE CENTRAL PROCESSOR—AN OVERVIEW

The CP circuits provide two specific functions: processing and maintenance. The processing circuits provide a general purpose computer without the ability to recover from hardware failures. The maintenance circuits together with the processing circuits provide the CMC with recovery capability.

The Central Processor is divided into ten circuits. The first four provide the processing function.

1. Timing Generator Circuit (TGC), designated 21,

2. Processor Control Circuit (PCC), 22,

3. Data Processing Circuit (DPC), 23, and

4. Input/Output Circuit (IOC), 24.

The first of the above circuits is the subject of the present invention. The remaining three circuits are described herein only to the extent necessary t0 understand the present invention. Additional details may be found in the above-referenced copending application of Brenski, et al, Ser. No. 289,718.

The remaining circuits in the CP provide the maintenance function and these include:

5. Configuration Control Circuit (CCC) 25,

6. Malfunction Monitor Circuit (MMC) 26,

7. Timing Monitor Circuit (TMC) 27,

8. Interrupt Control Circuit (ICC) 28,

9. Recovery Control Circuit (RCC) 29, and

10. Maintenance Access Circuit (MAC) 30.

In FIG. 2, there is shown duplicate copies of each of the above circuits in the Central Processor, with like circuits having identical reference numerals.

Turning back to FIG. 1, a pair of Peripheral Controllers is associated with each Peripheral Control Unit (PCU). Each Peripheral Controller 15 includes the following circuits which are also described in more detail in the above-referenced Brenski, et al. application Ser. No. 289,718, and need not be further described for an understanding of the present invention:

1. A Matrix Access Circuit 33,

2. An Address Register Circuit 34,

3. A Data Register Circuit 35,

4. A Timing Generator Circuit 36,

5. A Maintenance Status Circuit 37,

6. An Address Decode Circuit 38, and

7. A Control Decode Circuit 39.

It is believed that a better understanding of the present invention will be obtained if there is an understanding of the overall function of each circuit in the CP, realizing that there are duplicate copies of the CP.

II. A. PROCESSING CIRCUITS OF CENTRAL PROCESSOR

TIMING GENERATOR CIRCUIT (TGC)

Figure 2:
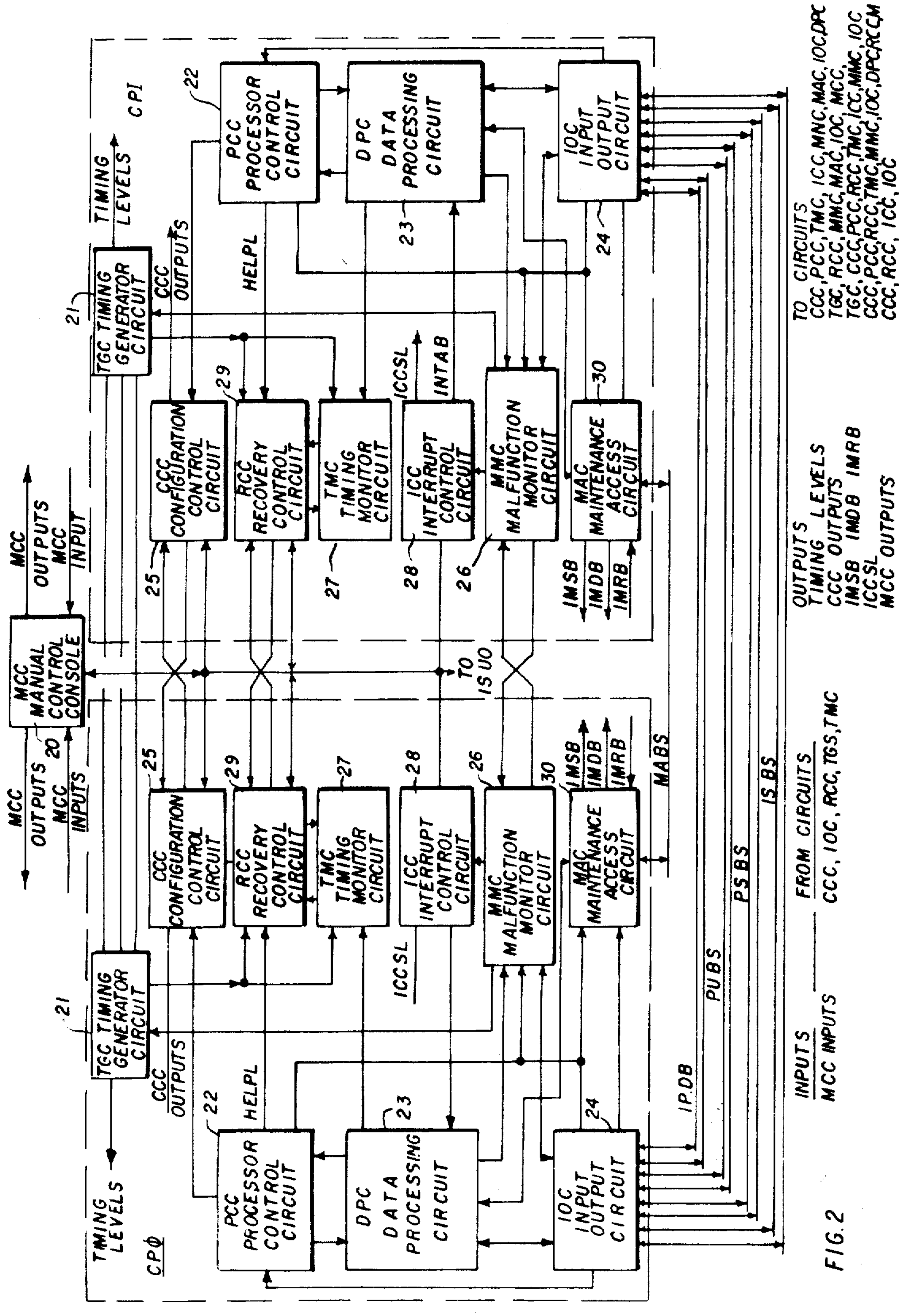
FIG. 2 is a functional block diagram showing redundant copies of the Central Processor and their associated busing systems.
Figure 3:
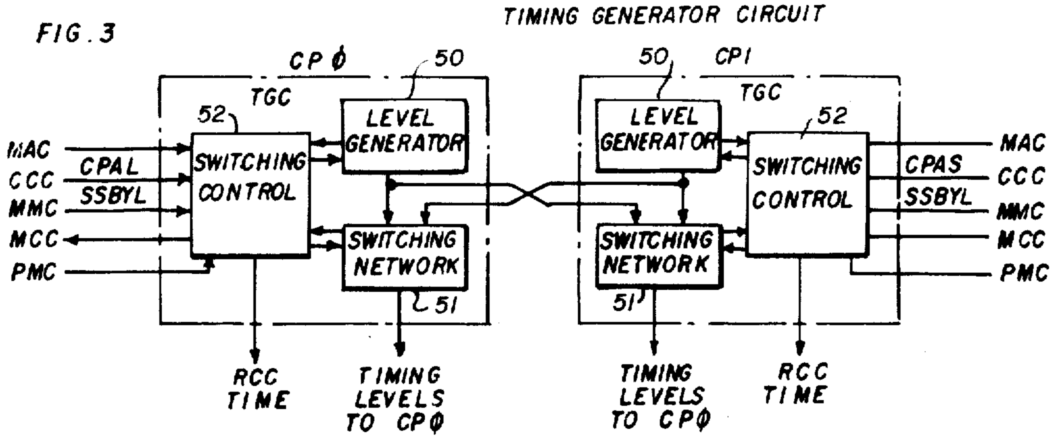
FIG. 3 is a functional block diagram of the Timing Generator Circuit of the Central Processor.

The Timing Generator Circuit 21 of FIGS. 1 and 2 (TGC) creates the timing intervals for the Central Processor. A more detailed functional block diagram for the TGCs of both Central Processors is shown in FIG. 3.

The TGC includes a level generator circuit 50 and creates eight timing intervals (or "levels" as they are sometimes referred to) every 4 $\mu$ seconds. Each pulse is picked off a delay line. For each timing interval, TGC produces a 500 nanosecond (ns) timing interval place level (PL) and a 400 ns. timing interval accept level (AL). Each sequence of 8 timing intervals is called a cycle. Nearly all sequential control in the CP is provided by the timing interval place and accept levels.

Generally, the timing interval place levels are used to gate information out of flip-flop storage while timing interval accept levels are used to accept information into flip-flop storage.

The TGC in each CP generate timing levels. To assure synchronism between CP's, timing levels generated in the active CP control both CP's. A switching network 51 actuated by a switching control circuit 52 in each TGC transmits (if it is in the active CP) or receives the timing levels from the active TGC, and supplies them to the remaining CP circuits. The standby CP may be stopped by directing the TGC in the standby CP to inhibit reception of timing levels. The TGS also notifies the Recovery Control Circuit 29 (RCC) and Timing Monitor Circuit 27 (TMC) for maintenance purposes whenever the CP's active/-standby status changes.

PROCESSOR CONTROL CIRCUIT (PCC)

The PCC 22 (see FIG. 4 for a more detailed functional block diagram) includes instruction fetch and decode circuits 53 which decode each instruction and generate the control signals required to execute the instruction and to read the next instruction from IS.

The instructions are performed in the DPC 23 by a sequence of data transfers—one in each of the eight timing intervals. Each data transfer is controlled by three simultaneous command from the PCC to the DPC:

1. A register place command (generated in block 54) which places a DPC register or circuit on the Interval Output Bus of the PCC.
2. A Bus Transfer Command (generated in bus transfer control circuits 55) which transfers the information on the Internal Output Bus to the Internal Input Bus, and
3. A Register Accept Command (also generated in block 54) which gates the information on the Internal Input Bus to a DPC register.

The PCC also provides auxiliary commands to the DPC such as the selection of the function to be provided by the Logic Comparator Circuit (LCC).

Memory and peripheral unit control circuits 55 of the PCC provide the control signals to the IOC including the mode bits to be transmitted to these complexes.

The instruction fetch logic of block 53 controls and Instruction Address Register IAR, Add One Register AOR, and the instruction store read for the next instruction. The next instruction is read from the Instruction Store simultaneously with the execution of its predecessor.

The PCC also decodes the HELP instruction which is an input to the RCC that initiates a system recovery program interrupt. The instructions RMSG (Read Maintenance Sense Group) WMSG (Write Maintenance Sense Group) and WMCP (Write Maintenance Control Point) are decoded by the PCC but are executed by the Maintenance Access Circuit 30 (MAC). The Malfunction Monitor Circuit 26 (MMC) requires decoded instructions levels from the PCC in order to sample malfunction detection circuits.

DATA PROCESSING CIRCUIT (DPC)

Figure 5:
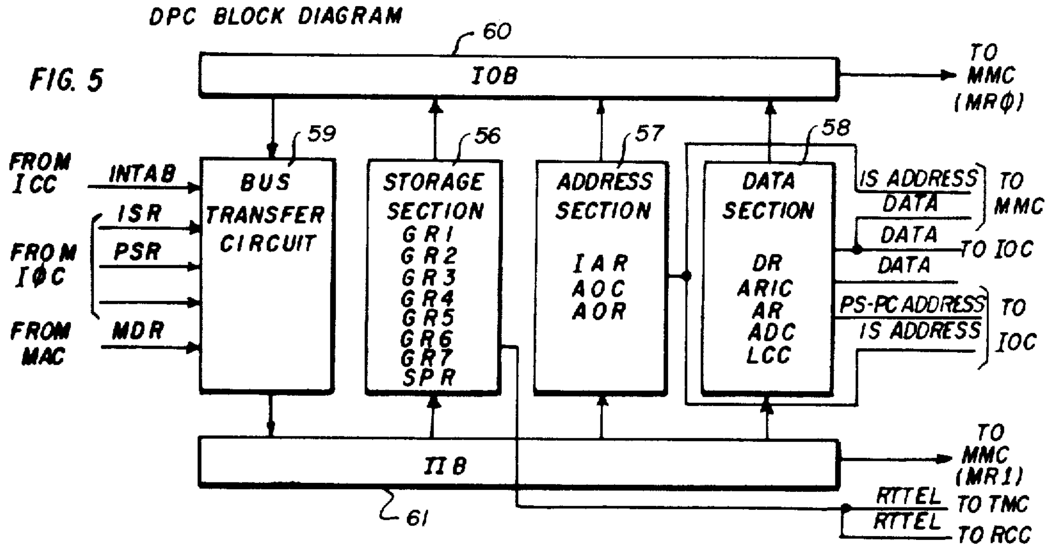
FIG. 5 is a functional block diagram of the Data Processing Circuit of the Central Processor.

The DPC 23 (see also FIG. 5) contains the registers of the CP and the circuits required to perform arithmetic, logical, decision, and data transfer operations on the information in these registers. The General Registers (GR1, ..., GR7), in the Storage Section 56, the Special Purpose Register (SPR), also in Storage Section 56, and the Instruction Address Register (IAR) in the Address Section 57 are the program accessible registers. These registers and the operations which are performed on these registers by individual instructions are described more fully in the above-referenced application.

The remaining registers [Data Register (DR) and Arithmetic Register (AR) in Data Section 58, the Selection Register (SR), and Add One Register (AOR] and circuits (Logic Comparator Circuit (LCC), Add Circuit (ADC) the Add One Circuit (AOC), and the Bus Transfer Circuit 59 (BTC) provide the data facilities required to implement the instruction operations on the program accessible registers.

A 32 bit Internal Input Bus (IIB) 60 is the information source for all DPC registers. In general, the DPC registers and circuits as well as other CP circuits place information on the 32 bit Internal Output Bus (IOB) 61. The Bus Transfer Circuit (BTC) 59 transmits information from the IOB 61 to the IIB 60. The information can be transferred in six ways which include complementing or not complementing the information, exchanging 16 bit halves (with or without complementing), or shifting the information left or right one bit.

A logic and compare circuit (LCC) provides a 32 bit logical AND, NOR, or EQUIVALENCE of the AR and DR and also matches the AR and DR. The ADD Circuit (ADC) provides the sum of the left half of the AR and the right half of the AR. The ADC is used for addition and substraction and to generate PS and PU addresses. The 17 bit Instruction Address Register (IAR) is used to address the Instruction Store. The Add-One-Circuit (AOC) increments the right most 16 bits of the IAR by one. The AOC is used to compute the next instruction address (one plus the current address) which will be used if a Program Transfer does not occur.

INPUT OUTPUT CIRCUIT (IOC)

Figure 6:
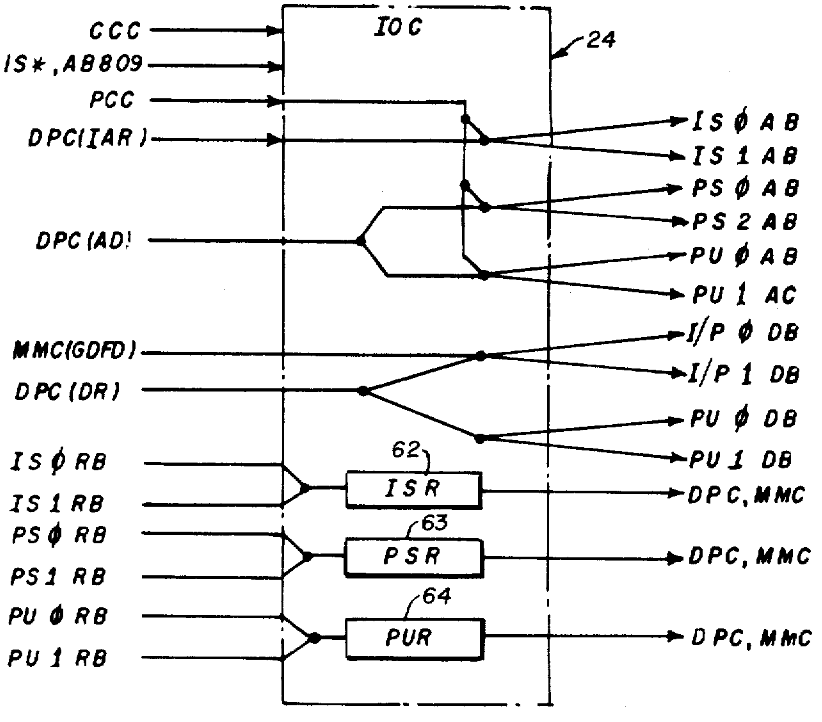
FIG. 6 is a functional block diagram of the Input/Output Circuit of the Central Processor.

The primary function of the IOC 24 (see also FIG. 6) is to provide the interface through which the Central Processor complex (CP*) gains access to the non-CP complexes (IS*, PS*, and PC*) via the external bus system. As seen diagrammatically in FIG. 6, the IOC sends data and addresses from the CP to the non-CP complexes and also receives and buffers data transmitted to the CP from non-CP complexes. The external bus system, used to transmit information between CP* and the non-CP complexes, comprises the Instruction Store Address Bus (IS*.AB), Process Store Address Bus (PS*.AB), Peripheral Control Address Bus (PC*.AB), Instruction Store-Process Store Data Bus (IP*.DB), Peripheral Control Data Bus (PC*DB), Instruction Store Return Bus (IS*.RB), Process Store Return Bus (PS*.RB), and Peripheral Control Return Bus (PC*.RB).

Each bus consists of two copies which are associated with corresponding copies of IS*, PS*, and PC*. At the processing level, the IOC may be considered to use both copies of the bus without distinction between the copies. To provide the reconfiguration capability (maintenance level), the IOC transmits on or receives from copy φ, copy 1, or both copies of a particular bus.

The choice of bus copies is determined by the Configuration Control Circuit 25.

There are three buffer registers in the IOC: the Instruction Store Register (ISR) designated 62, the Process Store Register (PSR) 63, and the Peripheral Unit Register 64. These registers communicate with both copies of the Return Buses from IS, PS and PU respectively; and they send received data to the DPC 23 and MMC 26, as shown.

II. B. MAINTENANCE CIRCUITS

The functions performed by the CP maintenance circuits include the following:

1. System configuration control (CCC 25).
2. Malfunction detection (MMC 26, TMC 27, DPC 23),
3. Recovery program initiation (ICC 28),
4. Recovery program monitoring (RCC 29, TMC 27),
5. Maintenance program access to CP circuits (MAC 30, MMC 26), and
6. Manual system control (MCC 20).

The CMC detects malfunctions as follows:

1. By matching, between CP copies, all data transfers in the CP Data Processing Circuit (MMC),
2. By parity checking of all memory read operations (MMC),
3. By monitoring internal checks by the IS*, PS*, and PC* (all-seems-well checks),
4. Address echo matching of addresses sent to IS*, PS*, and PC* with the echo address returned by the complex (DPC),
5. Timing level generation checking (TMC), and
6. Excess program time checking (DPC).

Figure 8:
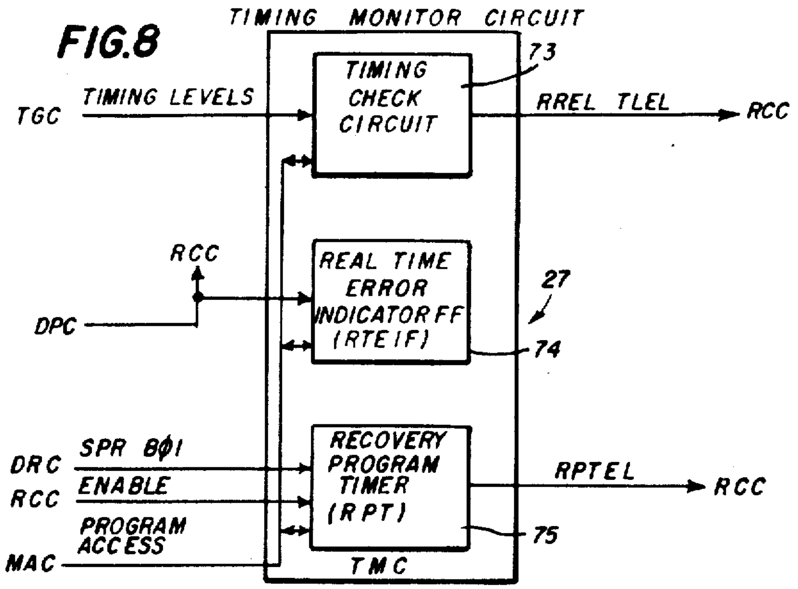
FIG. 8 is a functional block diagram of the Timing Monitor Circuit of the Central Processor.

When a malfunction is detected by MMC 26, the Interrupt Control Circuit (ICC) 28 may initiate a maintenance interrupt to a recovery program. The recovery program attempts to locate the faulty unit, remove it from service, and reconfigure the complexes to a working system. The execution of the recovery programs are monitored by the TMC 27 and the RCC 29. The system recovery program is initiated (reinitiated) by the TMC 27 and the RCC 29 when higher level recovery is required. The Timing Monitor Circuit monitors recovery programs through the Recovery Program Timer (RPT) in the TMC 27 (see FIG. 8). If a recovery program fails to remain in synchronism with this timer, the TMC initiates (or reinitiates) the system recovery program through the Recovery Control Circuit. The execution of a HELP instruction may also initiate (re-initiate) the system recovery program directly through the RCC.

MALFUNCTION MONITOR CIRCUIT (MMC)

Figure 7:
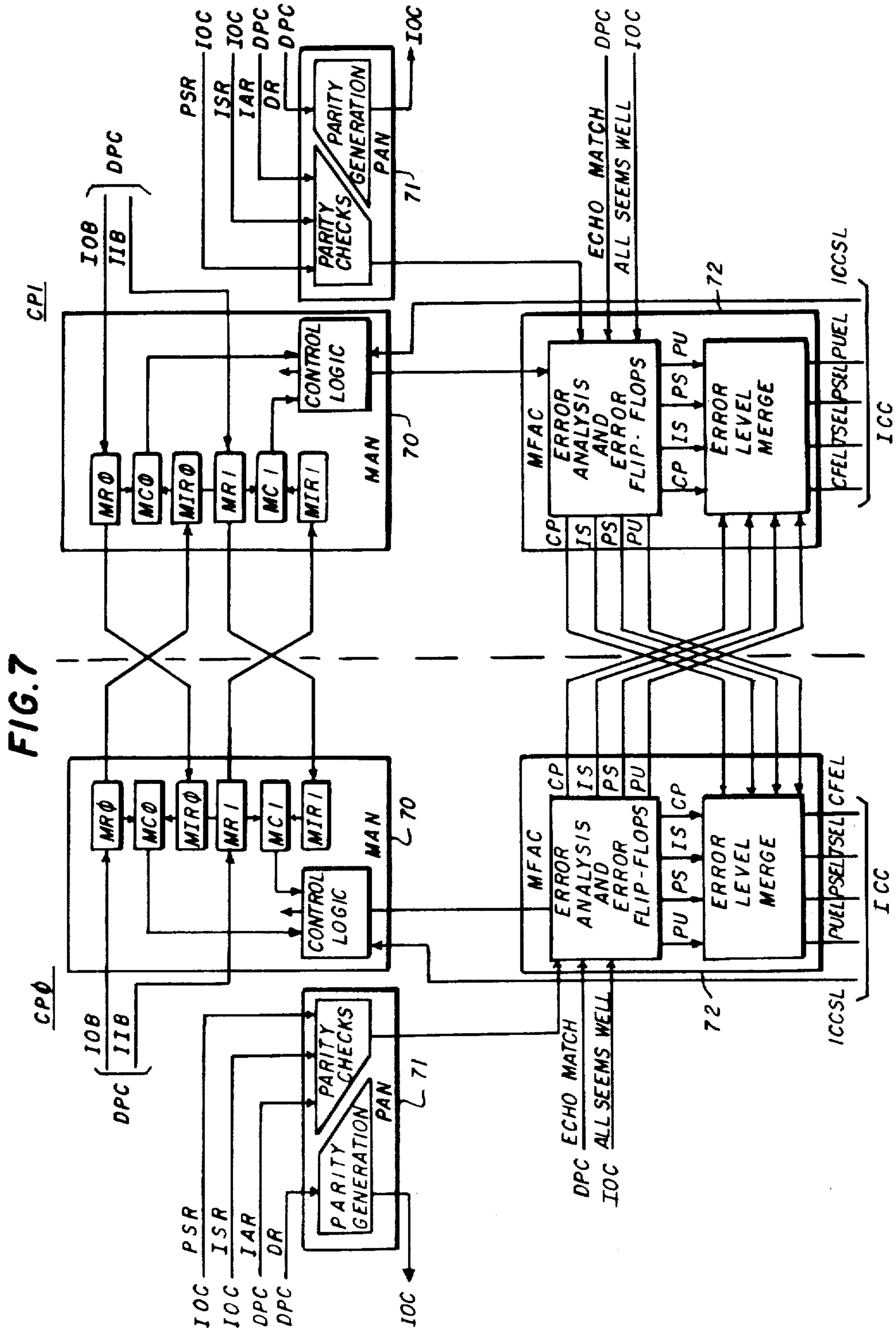
FIG. 7 is a functional block diagram of the Malfunction Monitor Circuit of the Central Processor.

The MMC 26 (seen in more detail in FIG. 7) provides the following maintenance functions:

1. Detection of malfunctions during the execution of programs,
2. Classification of malfunctions into CP*, IS*, PS*, and PC* caused malfunctions,
3. Indication of a CP, PS, or PC malfunction occurrence to ICC in each CP,
4. Storage of malfunction indications on error flip-flops,
5. Storage of the address of the instruction being executed when a maintenance interrupt occurs,
6. Special facilities for use by recovery programs,
7. Access to standby CP for extraction of diagnostic data through the match facilities,
8. Facility to monitor standby CP executing off line maintenance programs (Parallel Mode), and
9. Facilities for routining the MMC itself.

The Malfunction Monitor Circuit 26, shown is divided into the following three sub-circuits:

1. MAtch Network (MAN), designated 70,
2. PArity Network (PAN), designated 71, and
3. Malfunction Analysis Circuit (MFAC), designated 72.

The MAtch Network (MAN) provides all inter-Central Processor matching facilities. In addition to malfunction detection, the match network can be used for extracting diagnostic data from the standby CP for routining the match network itself. The control logic within the MAN controls the match network according to match modes selected by the maintenance programs.

The PArity Network 71 (PAN) contains all the Parity Circuits used in checking the transmission and storage of information in the Instruction Store (IS*) and Process Store (PS*).

The Malfunction Analysis Circuit 72 monitors malfunction detection signals from 1. MAN (inter CP matching),
2. PAN (parity checks),
3. DPC (address echo match), and
4. IOC (all-seems-well signals).

The malfunction detection signals are sampled according to the timing intervals and instructions being executed. When a malfunction is detected an error flip-flop associated with the detection circuit is set to be used by maintenance program to isolate the source of the malfunction.

The malfunction analysis circuit classifies the malfunction according to its most likely cause (CP*, IS*, PS*, or PC*) and a corresponding error level (CPEL, ISEL, PSEL, or PUEL) is sent to the Interrupt Control Circuit (ICC) in both CP's.

TIMING MONITOR CIRCUIT (TMC)

The TMC 27 (FIG. 8) provides three timing malfunction detection circuits:

1. Timing check circuit 73 which checks the timing levels generated by TGC,
2. A Real Time Timer Error FF (RTEIF) 74 which monitors the state of the overflow of the Real Time Timer RTT in DPC, and
3. A Recovery Program Timer (RPT) 75 which monitors recovery program execution.

Most failures of the active Timing Generator Circuit (TGC) do not cause inter-CP mismatches. These failures are detected by the TGC checking circuitry of the active TMC. The output of this circuit is monitored by the active Recovery Control Circuit (RCC).

Failures of the standby TGC will cause inter-CP mismatches and are detected by the Malfunction Monitor Circuit. The standby RCC ignores error outputs of the standby TMC.

RTT, which is located in the DPC, has both an operational and a maintenance function. It provides real time synchronization for the operational programs and a sanity check on the execution. The RTT is a 14 bit counter which is incremented by one every CP cycle (4 microseconds). The program may read or modify RTT through the Special Purpose Register (SPR). In this manner, RTT can provide time intervals of up to 65 milliseconds for the operational programs. The programs, however, must reinitialize RTT often enough to prevent the overflow from occurring. The active RCC monitors the RTT overflow. If the overflow occurs, RTEIF is set and the RCC initiates the system recovery operation.

RPT checks the execution of the Recovery programs. RPT is a seven bit counter which, when enabled, is incremented by one every CP cycle. RPT is enabled whenever a maintenance interrupt occurs and is disabled by the recovery program through MAC when recovery is completed.

The active RCC monitors the RPT of the active TMC and initiates further system recovery operations if the recovery programs fail to reset the RPT in the correct interval. The RPT has two checking modes. When first enabled by a maintenance interrupt, the recovery program must check into the RPT through the SPR exactly every 128th cycle. The recovery program may change the checking mode to permit check-in before the 128th cycle. In the second mode, check-ins may not be more than 128 CP cycles apart. The recovery program changes the checking mode or disables the RPT through MAC and must do it at exactly the 128th cycle.

INTERRUPT CONTROL CIRCUIT (ICC)

Figure 9:
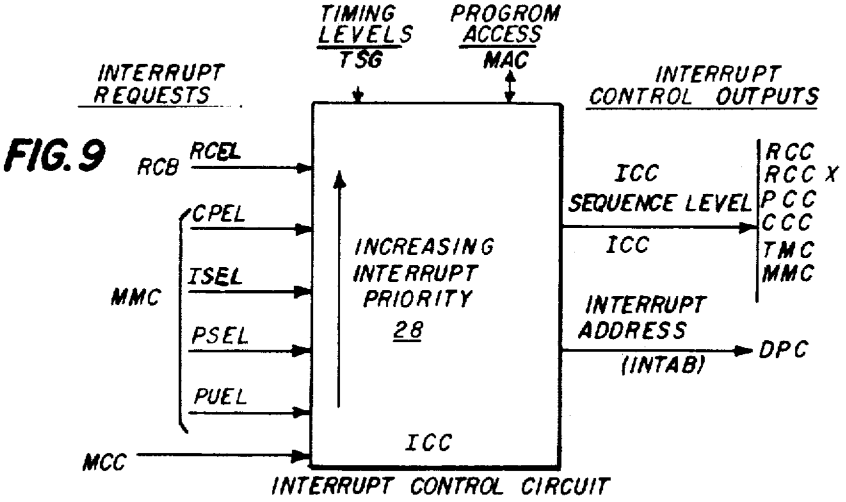
FIG. 9 is a functional block diagram of the Interrupt Control Circuit of the Central Processor.

The ICC 28 (FIG. 9) controls the execution of maintenance interrupts. A maintenance interrupt is a one-cycle wired transfer instruction which causes the CMC to begin execution of a recovery program. The malfunction detection circuits in the CP initiate maintenance interrupt whose execution takes precedence over the execution of any other CP instructions.

The ICC provides five maintenance interrupts:

1. System Recovery,
2. CP recovery,
3. IS recovery,
4. PS recovery, and
5. PU recovery.

When an interrupt occurs, the ICC products an ICC interrupt Sequence Level (ICCSL) which controls the execution of the interrupt in the other CP circuits. The recovery program address corresponding to the interrupt is also placed on the INTerrupt Address Bus (INTAB) to the Data Processing Circuit, from which it is sent to the IS.Uφ as the address of the next instruction to be executed.

The Malfunction Monitor Circuit initiates the CP, IS, PS, and PU recovery interrupts. The Recovery Control Circuit or the Manual Control Console initiates the system recovery interrupt. An interrupt may be initiated by either circuit during the execution of an operational program when a malfunction occurs. During the execution of a recovery program additional interrupts may occur as a part of the recovery process.

To handle simultaneous interrupts and interrupts during execution of a recovery program, the ICC produces maintenance interrupts according to a priority structure. The system recovery interrupt has highest priority and cannot be inhibited. The CP, IS, PS, and PU interrupts follow respectively in descending order of priority. A CP, IS, PS, or PU interrupt can occur if the interrupt itself or a higher priority interrupt has not already occurred. CP, IS, PS, and PU interrupts may be individually inhibited by the maintenance programs.

RECOVERY CONTROL CIRCUIT (RCC)

Figure 10:
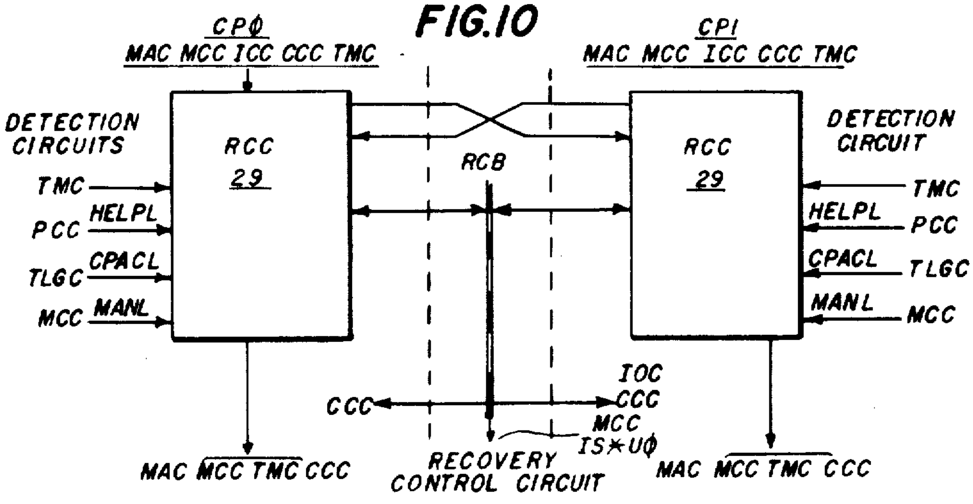
FIG. 10 is a functional block diagram of the Recovery Control Circuit of the Central Processor.

The RCC 29 (shown in duplicate copy in FIG. 10) monitors the malfunction detection circuits which cause system recovery program interrupts. The detection inputs to the RCC (RCC triggers) are produced by the timing generation check circuit in the TMC, error level from the DPC, the Recovery Program Timer in the TMC, and HELP instruction executed by the PCC, CP active unit change detected by the TGC, and a manual request from the MCC.

Only the active RCC accepts triggers and initiates system recovery action. The RCC in the Standby CP is kept in synchronism with the active RCC but cannot affect the operation of the CMC.

When a trigger to the active RCC occurs, the RCC executes a wired logic reconfiguration program and then requests the ICC to execute a system recovery program interrupt. If the system recovery program cannot be completed (i.e., the configuration is not operable), another trigger occurs. Each consecutive trigger causes the RCC to force one of the four combinations of CP*, and IS*.Uφ configurations CPφ-ISφ.Uφ, CP1-ISφ.Uφ, CP1-ISI.Uφ, and CPφ-ISI.Uφ). When an operating CP*-IS*.Uφ configuration is selected, the system recovery program completes the recovery and reconfiguration process without further intervention by the RCC.

CONFIGURATION CONTROL CIRCUIT (CCC)

Figure 11:
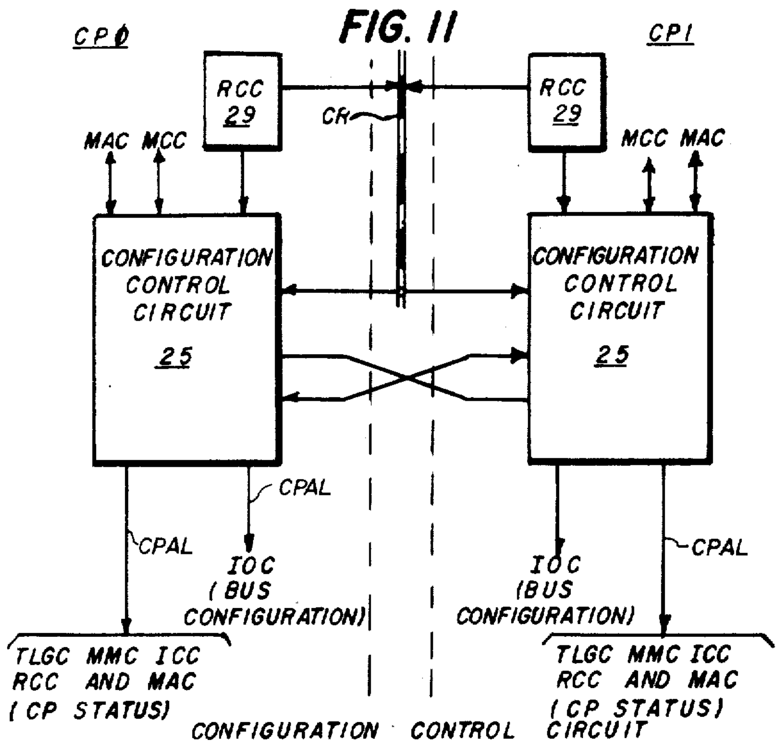
FIG. 11 is a functional block diagram of the Configuration Control Circuit of the Central Processor.

The CCC 25 (FIG. 11) defines the system configuration by controlling:

1. CP* status, and
2. The CP*-IS&, CP*-PS*, and CP*-PC* configurations.

The CP status is specified by:

1. The active CP indication,
2. The standby CP trouble status, and
3. The CP-CP error signal status (separated CPs or coupled CPs).

Each of the IS*, PS*, and PU*, has a bus system (address bus, data bus—the PS and IS share a data bus, and return bus). Each copy within IS*, PS*, and PU* is permanently associated with an individual bus copy. The CCC defines the CP*-IS*, CP*-PS*, and CP*-PC* configurations by specifying the bus copy on which each CP copy sends and receives.

The CCC first defines a primary bus copy for each of the IS, PS, and PC bus systems. The active CP always sends and receives on the primary bus. The standby CP sends and receives according to the specific bus configuration. For each primary bus copy selection, four bus configurations can be defined:

1. DUPLEX specifying that the standby CP sends on and receives from the non-primary bus copy,
2. SIMPLEX specifying that the standby CP receives from the primary bus copy while the non-primary bus copy is not used,
3. MERGED specifying that the active CP sends on both bus copies and both the standby and active CP's receive from both bus copies (i.e., the return buses are merged), and
4. SIMPLEX-UPDATE specifying that the active CP sends on both bus copies to update the secondary memory copies but the standby CP receives from the primary bus copy only.

The duplex bus configuration is used when both CP's and all units on both buses are in-service. The simplex configuration is used when a unit on the secondary bus is out of service. The merged configuration is used when units on both the primary and secondary buses are out-of-service. The update configuration is used while updating an in-service unit on the secondary bus.

A diagnostic bus configuration is also available for IS* which is used in the diagnosis and recovery of IS*.

MAINTENANCE ACCESS CIRCUIT (MAC)

Figure 12:
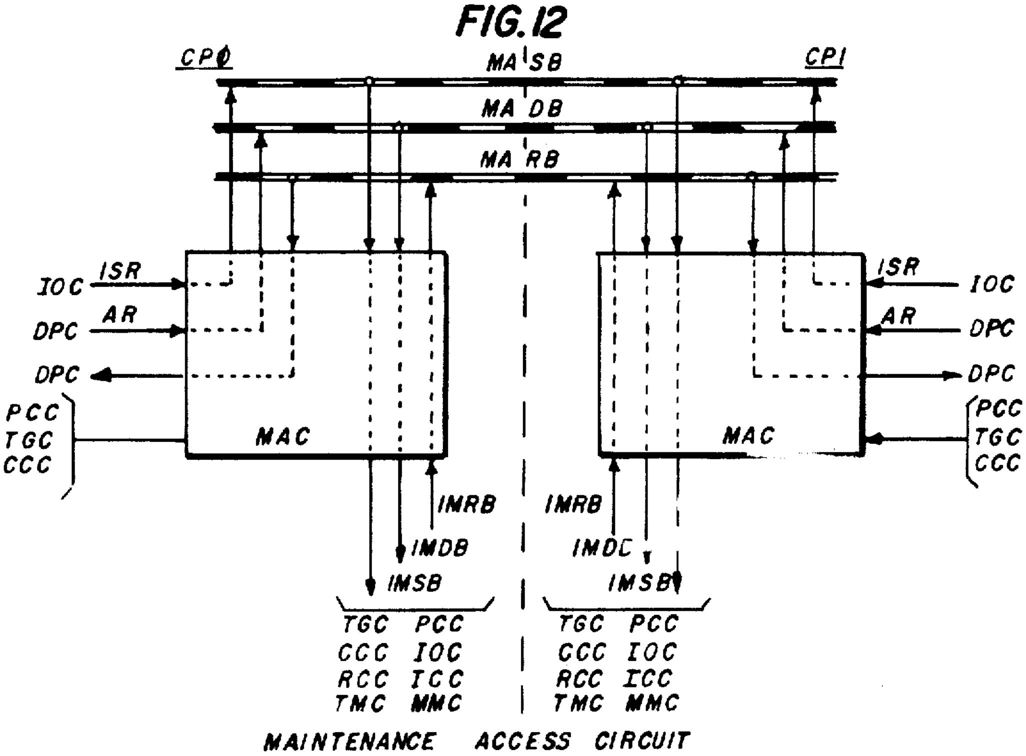
FIG. 12 is a functional block diagram of the Malfunction Monitor Circuit of the Central Processor.

The MAC 30 (FIG. 12) provides maintenance program access to the CP circuits. Read Maintenance Sense Group (RMSG) is an instruction which allows a group of 32 sense points from either the active or the standby CP to be read into a general register (GR1–GR2 of the Data Processor Circuit 23, see FIG. 5). Write Maintenance Control Group (WMCG) and Write Maintenance Control Point (WMCP) are instructions which respectively allow the program to write a group of 32 maintenance control points or a single control point in either the active CP, the standby CP, or both CPs. In this context, "writing" means that each maintenance control point sets or resets one or more flip-flops.

Although the instructions are decoded and controlled by the PCC, as explained more fully in the above-identified Brenski, et al., application Ser. No. 289,718, MAC selects the control groups, transmits write data from the DPC to the maintenance control groups selected, and reads maintenance sense groups returning data to the DPC.

Maintenance sense and control groups in either the active or standby CP are always selected by the MAC in the active CP only. Write data for maintenance control groups is also always taken only from the MAC in the active CP. In other words, only the MAC in the active CP can execute MAC instructions.

POWER MONITOR CIRCUIT (PMC)

A Power Monitor and Control Circuit (PMC) (see FIG. 23) controls the actions necessary to turn power on or off from a CP or controls the actions necessary to remove power from a CP in which there is a defective power supply.

In case of trouble in a power supply of a CP copy, the PMC will remove all remaining power supplies from that copy.

When power is turned back onto the CP, the PMC will guarantee that the power can be turned on only to the standby CP while keeping the other CP active.

DETAILED DESCRIPTION OF TIMING GENERATOR CIRCUIT (TGC)

Figure 4:
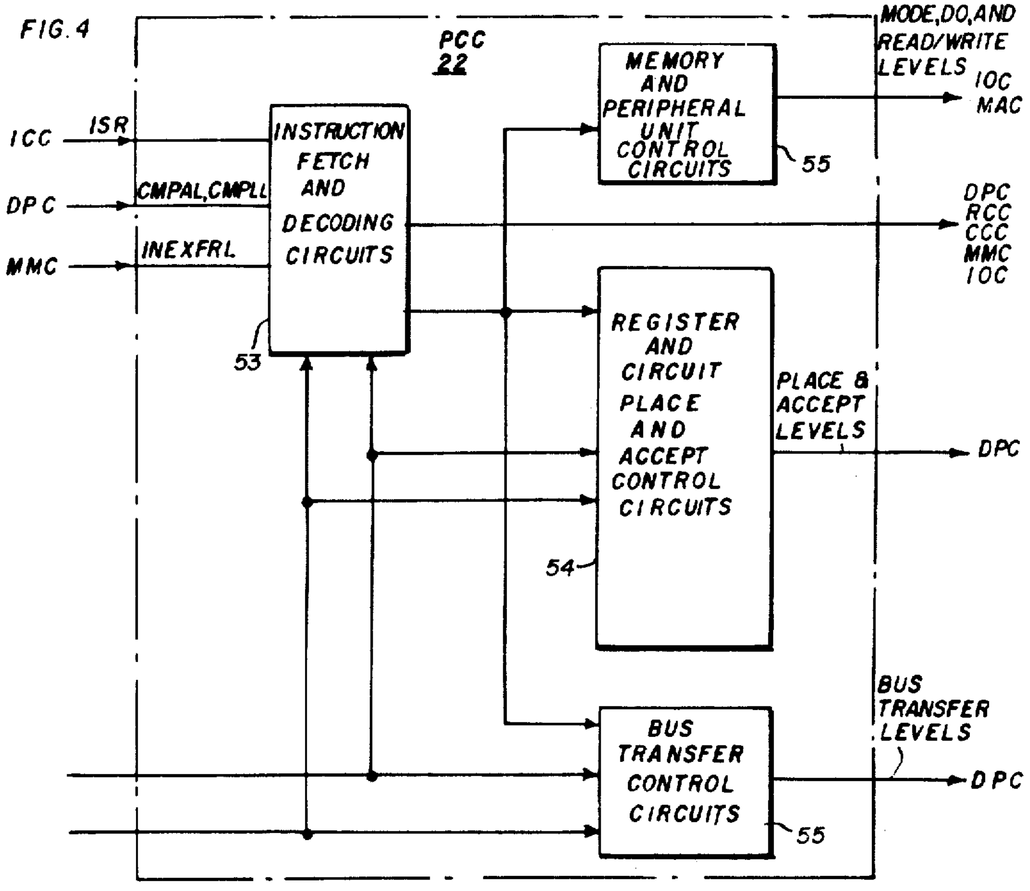
FIG. 4 is a functional block diagram of the Processor Control Circuit of the Central Processor.

Referring now to FIGS. 3 and 4, there are two Timing Generator Circuits 21, one in each copy of Central Processor. Since they are the same in structure and operation only one need be disclosed in detail. As already mentioned, the Timing Generator Circuit in the active Central Processor (CP) supplies the timing levels for both the active CP and the standby CP. The TGC in the standby does not transmit levels to either CP complex. The timing levels received by the standby CP from the active, can be inhibited by the active CP under hardware or software control. Inhibiting the timing levels in effect turns off the standby CP. When the inhibit is removed, both the active and the standby CP will be operating in the same timing interval. In addition, each timing level in the standby CP can be controlled (i.e., held constant) individually for diagnostic purposes.

The two Timing Generator Circuit clocks do not run in synchronization, therefore, when the CP status is reversed, (active becomes standby, standby becomes active) special action is taken in order to avoid problems in the system due to the switch of the source of the timing levels. The TGC in the newly active CP will not start transmission of timing levels to either machine for at least 2 microseconds after the switch, allowing the communications buses to settle down. The first level to be transmitted to both CP's will be the start of a new machine cycle. During the switching operation, the TGC in the newly activated CP notifies its RCC that a reversal of CP status has occurred, which requests a System Recovery Program to be run in order to determine the sanity of the new active CP. The TGC also notifies the Timing Monitor Circuit (TMC) that the Timing Level Check Circuit in the TMC should be initialized in order to check the correct sequences of the timing levels generated by the TGC in the active CP.

Figure 14:
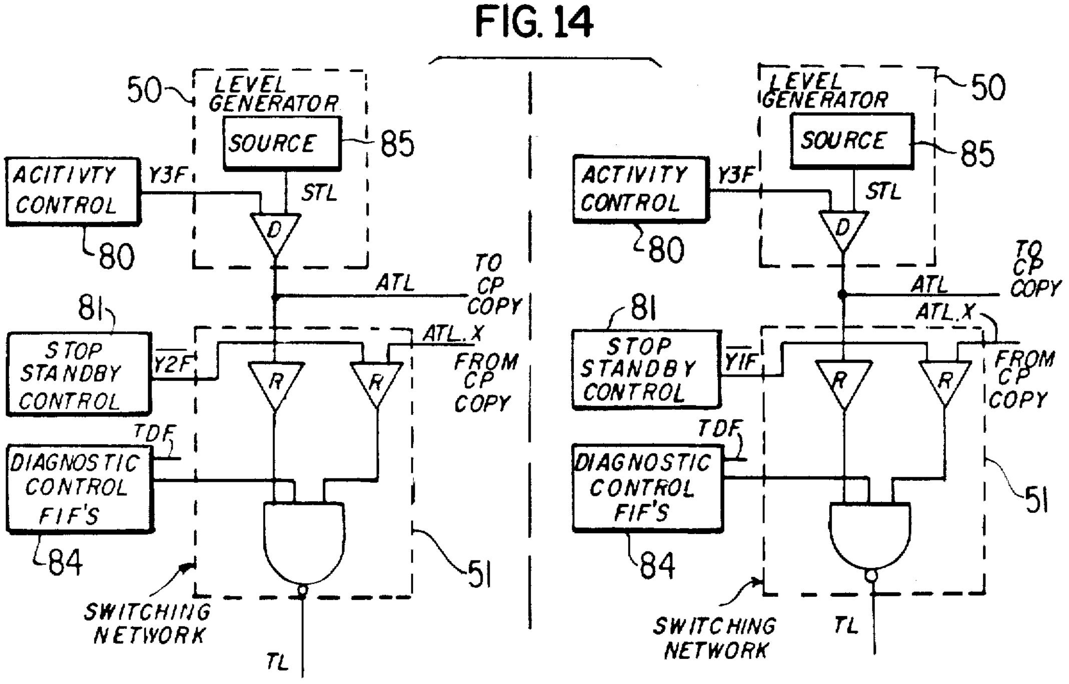
FIG. 14 is a functional block diagram of duplicate copies of the Timing Generator Circuit.

Each TGC is composed of the following major sections: the Level Generator 50 (FIGS. 3 and 14) (source of timing levels), the Switching Network 51 (where timing levels from both TGC's are gated) and the Switching Control 52 which includes an Activity Control Circuit 80 and a Stop Standby Control Circuit 81. FIG. 14 also shows Diagnostic Control Flip-Flops 84. These circuits are all the same for each copy of TGC.

LEVEL GENERATOR

Figure 13:
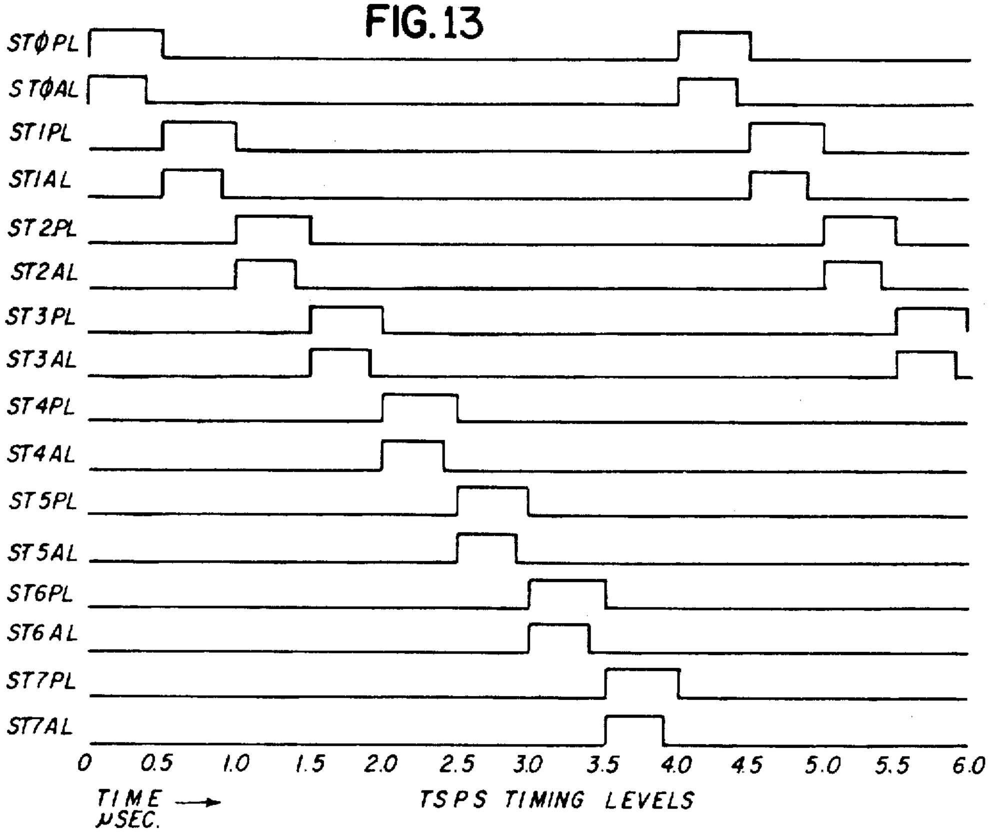
FIG. 13 is a timing diagram showing all of the place levels and accept levels in the Central Processor.

Referring to FIG. 13, each Basic Order Time (BOT) or machine cycle of 4 sec. is divided into eight sequential 500-nanosecond time slots. Each time slot contains a Place Level (i.e., signal or pulse) and an Accept Level used to gate and control the internal sequences of the CP. The Place Levels are 500 nanoseconds long while the Accept Levels are 400 nanoseconds in length.

Figure 15:
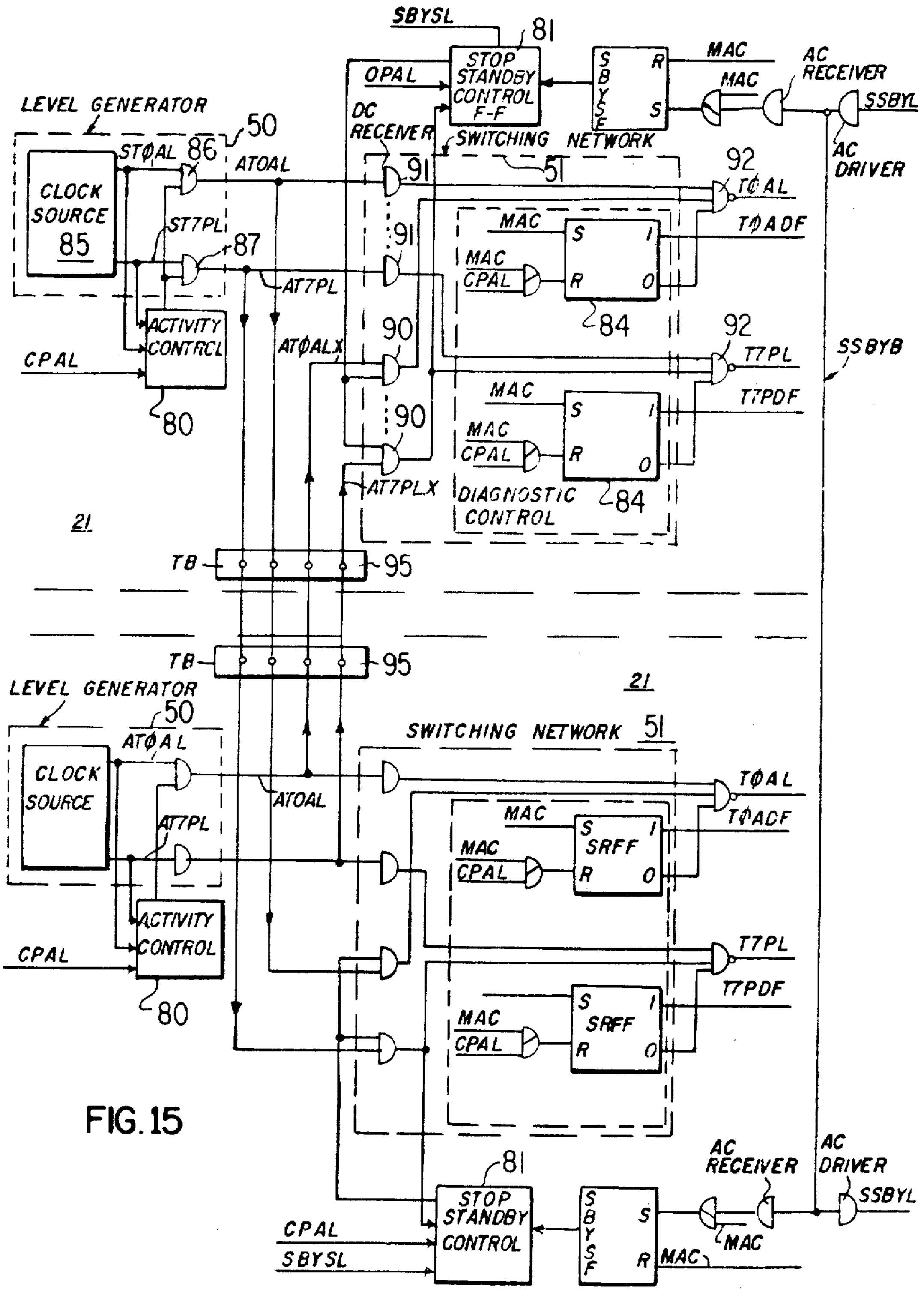
FIG. 15 is a more detailed functional block diagram of the duplicate copies of the Timing Generator Circuit.

As seen in FIGS. 14 and 15 (more detail is shown in the latter) the Level Generator 50 includes a clock source 85 which may include a delay line with a number of tops forming outputs. Such circuits are well known. Each output is fed to an enable gate 86. The Level Generator of the active TGC produces all 16 of the timing levels that will be sent to both CP's (i.e., STϕAL–ST7AL, STϕPL–ST7PL). The Place Levels produced by the clock source 85 in the Level Generator are designated STϕPL through ST7PL (FIG. 13), where the prefix S designates the level produced by the Source. The place Levels are passed through enable (or AND) gates 87. The Accept Levels are designated STϕAL through ST7AL. It will be observed from FIG. 13 that the Accept Levels start in coincidence with the Place Levels. The 16 levels are controlled by the Activity Control Circuit 80 which will, under non-fault conditions, permit only the active Level Generator's levels to be passed. The gated signals are designated ATϕPL through AT7PL and ATϕPL through AT7AL in FIG. 15.

SWITCHING NETWORK

Figure 16:
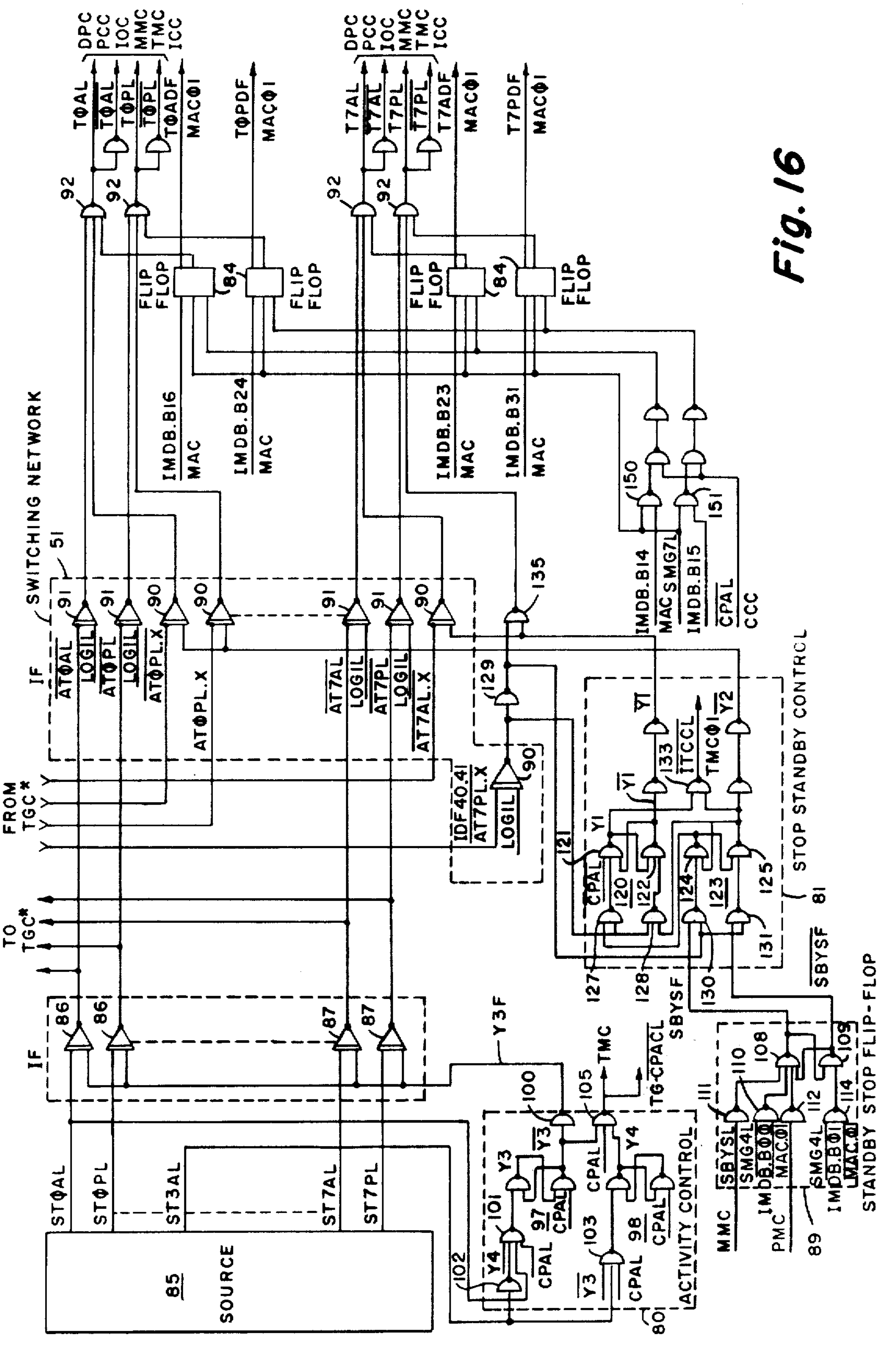
FIG. 16 is a logic circuit diagram of a timing generator circuit.

The Switching Network 51 of each TGC receives two sets of the 16 timing levels, one set (ATφAL . . . AT7AL, ATφPL . . . AT7PL) from its own Level Generator, the other set (ATφAL.X . . . AT7AL.X, ATφPL.X . . . AT7PL.X) from the other CP's Level Generator, as shown. Under non-fault conditions, only one set of timing levels will actually be pulsing; the set received from the active CP. The timing level set received from the other CP is controlled by the Stop Standby Control section 81 of the TGC. Referring to FIG. 16, it includes a Stop Standby Control Flip-flop 89. The Stop Standby control section selectively inhibits the levels generated by the other TGC by controlling gates 90 in the Switching Network 51. The timing levels from its own Source are fed through gated DC drivers or receivers 91 to NAND gates 92. The other input of each driver 91 is tied to a logic "1" so that the gates are always enabled. The NAND gates 92. The NAND gates 92 receive corresponding timing level signals from the respective ones of gates 90, 91 together with the reset output of an associated Diagnostic Control Flip-flop 84 (one for each level) to gate the 16 separate, sequential Accept and Place timing levels. The inputs to the flip-flops 84 are as illustrated in the drawing; and the two copies of the TGC are interconnected via Terminal Blocks 95, as illustrated. The outputs of the switching Network are designated as TφPL through T7Pl (Place Levels) and TφAL through T7Al (Accept Levels).

ACTIVITY CONTROL CIRCUIT

The purpose of the Activity Control 80 is to handle the transmission of the timing levels produced in the Level Generator to both CP's after a reversal of CP status occurs (i.e., active to standby or vis-versa). The functions of the Activity Control are:

a. Inhibit all timing levels in the newly standby CP.

b. Inhibit all timing levels from the newly active CP for at least 2.0 μsec. in order to allow all communications buses and memory units to complete previous given commands.

c. Generate a level indicating a CP status change to the newly active CP's Recovery Control Circuit (RCC), thereby requesting the System Recovery Program to be run on the new active CP and Instruction Store bus combination in order to determine their sanity.

d. After Delay (b), start gating the active levels with STφPL and STφAL.

e. Initialize the Timing Level Check Circuit in the new active CP's Timing Monitor Circuit (TMC).

As shown in FIG. 17, the control states necessary for controlling the above functions are as follows:

Sφ: This is the standby state for the TGC. All timing levels from the Level Generator in this TGC are inhibited.

S1: This is a temporary or transition state between Sφ and S2. All timing levels from the Level Generator in this TGC are inhibited. During the S1 state, the CP Activity Change Level (CPACL) is sent to RCC 29 and TMC 27.

S2: This is the active state for the TGC. All timing levels are gated through the Switching Network of this TGC to the CP and to the external (standby) TGC.

Referring particularly to FIG. 16, the Activity Control Circuit 80 is seen to include a first flip-flop circuit 97 and a second flip-flop circuit 98, each made from a pair of NOR gates. The output of the flip-flop 97 is designated Y3, and it is the reset output of this flip-flop fed through an inverter 100 which is coupled to the enable inputs of the gates 86, 87 in the level generator 50. That is, a signal on this input lead will inhibit the transmission of timing levels from the source 85 to the switching network 51 when the TGC is standby. On the other hand, this signal in the active TGC not only transmits the timing level signals to its own switching network 51, but transmits the same levels to the complementary TGC (denoted TGC*).

The Timing Level STφAL is fed to a four input NOR gate 101 which receives the levels Y4 and CPAL (which is the signal designated that a particular CP is active). The other input of the gate 101 is received through an inverter 102 from the level ST3AL, which signal also feeds a NOR gate 103, the output of which is coupled to the set side of the Y4 flip-flop designated 98. The other two inputs to the NOR gate 103 are CPAL and $\overline{Y3}$. CPAL resets both flip-flops Y3 and Y4, and it is fed to a NOR gate 105, which also receives the inputs Y4 and $\overline{Y3}$. The output of the NOR gate 105 is fed to the Timing Monitor Circuit 27 and to the Recovery Control Circuit 29. This is the signal CPACL, that is, Central Processor Activity Change Level which tells these two circuits that the status of the CP is being changed, and from which state to which state.

The operation of the Activity Control Circuit 80 starts with the reception of CPACL (that is, when it goes to a logical 1). Assuming that the Activity Control Circuit is in state 0 of FIG. 17 (stable-standby), when timing level ST3AL is generated by the source 85, the flip-flop 98 will be set, thereby generating signal Y4. This defines state S1 in the state diagram of FIG. 17, and the signal CPACL is then generated and transmitted to the TMC and to the RCC, telling the RCC to initiate the system recovery program since changes taking place, and initializing the circuits in the timing monitor circuit. The timing for this change in the Activity Control Circuit is shown in FIG. 19, and the first set of timing signals—namely, at the occurrence of ST3AL, YF4 goes to a 1 and CPACL is generated. At the next occurrence of STφAL, NOR gate 101 is actuated to set flip-flop 97, thereby causing Y3 to go to a 1. This, in turn, will stop the generation of the level CPACL by means of the gate 105, and at the same time, enable the gates 86, 87 to transmit the timing levels from source 85 via gate 100. Thus, the Activity Control Circuit is in the state S2, stable and active. It will be observed that if the level CPAL inverts between the time ST3 and ST7 while the activity control circuit is in state S1, the flip-flops 97, 98 are reset, and the Activity Control Circuit returns to state Sφ. This is also true at any subsequent time that CPAL goes to a 0, as indicated in the third timing sequence of FIG. 19.

In summary, referring to the flow table of FIG. 18, in the active CP, the Activity Control 80 will normally be in state S2, while the Activity Control in the standby CP will be in state Sφ. When the CP Activity Level (CPAL) becomes false or φ in the active CP (becomes true in standby CP), the Activity Control in the active CP moves from state S2 to Sφ, thereby inhibiting all ATφPL through AT7AL levels by having Y3 go to φ. The Activity Control in the previously standby CP remains in Sφ until its Level Generator has produced an ST3AL level, thereupon moving from Sφ to S1. The Activity Control will move to S2 when its Level Generator generates a subsequent STφAL. The CP status reversal is thus completed.

STOP STANDBY CONTROL

Another function of the TGC is to stop the standby CP by inhibiting the reception of timing levels from the active CP. This is accomplished by disabling gates 90 in the Switching Network 51. If the standby CP is to be stopped, the Standby Stop Flip-flop (SBYSF) 89 must be set. This flip-flop (comprising NOR gates 108, 109) may be set by any of the following:

a. Program control through the use of the Maintenance Access Circuit in the active Cp which controls gate 110.

b. The active CP's Malfunction Monitor Circuit (MMC) which controls gate 111. This may be due to either a maintenance interrupt or the execution of a sample match.

c. The Power Monitor Circuit (PMC) via gate 112 when Power is turned on to the standby CP.

The setting of the flip-flop 89 to generate level SBYSF enables the Stop Standby Control 81 in the standby CP to perform the following operations:

a. Complete the present machine cycle through T7PL so that the instruction in the standby CP may be complete before the timing levels are inhibited.

b. After the termination of the machine cycle, all timing levels (TφPL through T7AL) in the standby TGC are inhibited.

In order to start the standby, the SBYSF 89 must be reset. This can only be performed under program control via gate 114 by the MAC 30 which transmits a signal along Bit φ1 of the Internal Maintenance Data Bus. When the SBYSF is reset, the Stop Standby Control 81 in the standby CP performs the following functions:

a. Start transmission of timing levels to the standby CP at the beginning of a machine cycle (TφPL and TφAL) without pulse splitting.

b. Continue transmitting timing levels to the standby CP as long as SBYSF is reset.

c. Generate a level to initialize the Timing Level Check Circuit in the standby CP's Timing Monitor Circuit (TMC). This is level ITCCL.

The Stop Standby Control 81 includes a first flip-flop 120 comprising NOR gates 121 and 122, and a second flip-flop 123 including NOR gates 124 and 125. The output level of the flip-flop 120 is designated Y1, and the set output level of flip-flop 123 is designated Y2. Timing for the setting and resetting of flip-flop 120 is received from the TGC in the other CP, namely level AT7PL.X. This level is fed to NOR gates 127 and 128 which, in turn, feed respectively the NOR gates 121, 122 of flip-flop 120. The inverse of this level (generated through NOR gate 129 is coupled to the inputs of two other NOR gates 130 and 131 which, in turn, feed the inputs of NOR gates 124, 125 of the flip-flop 123. A NOR gate 133 receiving inputs from a set output Y1 and the reset output $\overline{Y2}$ generates the level $\overline{ITCCL}$, which is fed to the Timing Monitor Circuit. The reset side of flip-flop 120 feeds the gate 90 associated with incoming timing level $\overline{AT7AL.X}$ of the switching network 51, and it also feeds one input of a NOR gate 135, the other input of which is the output of NOR gate 129. The reset output $\overline{Y2}$ of the flip-flop 123 is coupled to each of the gates 90 in the switching circuit 51 associated with the first six timing levels (that is, all gates except for those associated with AT7AL.X and AT7PL.X).

Referring to FIG. 20, control states necessary for stopping the standby are as follows:

Referring to FIG. 20, control states necessary for stopping the standby are as follows:

Uφ: This is the normal operation state for the standby TGC. In this state timing levels generated in the external TGC are sent through the gates 90 of the standby TGC and to the standby CP. In this state both flip-flops 120, 123 are in the reset condition, and, hence, Y1F=φ and Y2F=φ.

Figure 22:
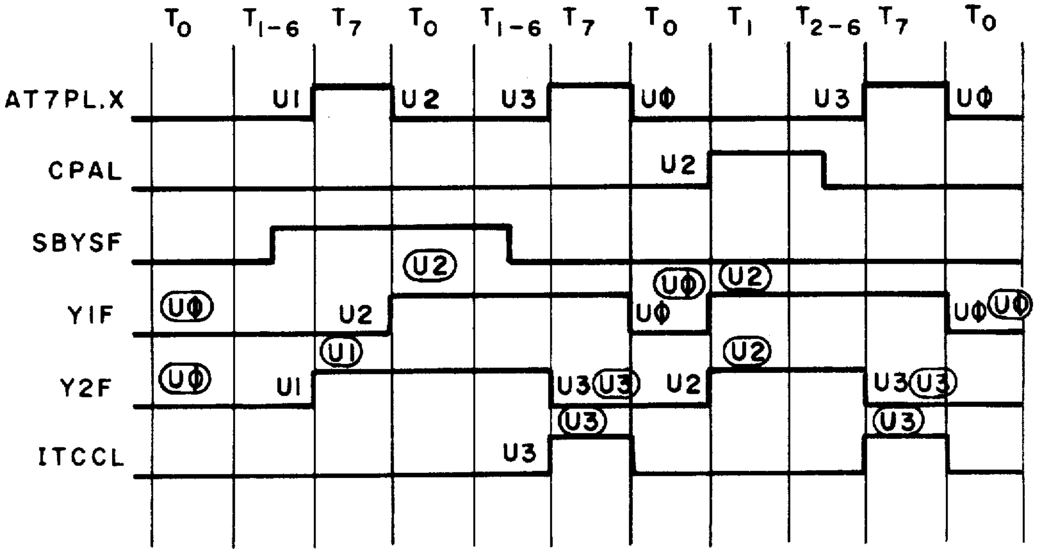
FIG. 22 is a timing diagram showing the switching sequence for the Stop Standby Control Circuit.

U1: This is a transition state between Uφ and U2. In this state T7PL and T7AL are sent to the standby CP as gated by gate 135 (for the T7PL) and the gate 90 associated with AT7AL.X (i.e., level Y1). In other words, the other place and accept levels are inhibited by flip-flop 123 $\overline{Y2}$ goes to 0 when the next T7 occurs as seen on FIG. 22). This state is necessary to allow the TGC to finish sending a complete cycle of timing levels (TφAL and TφPL through T7AL and T7PL) to the CP, before stopping the standby timing levels, and to prevent any part of the next cycle from reaching the CP. Note that for instructions which require two cycles, this control may allos the first cycle to be completed but not the second.

U2: When the standby TGC is in this state, no timing levels reach the standby CP. This is also the state in which the active TGC rests but this does not affect the distribution of the timing levels. It will be observed that CPAL always forces the Stop Standby Control to state U2 when the TGC is becoming active.

U3: This is a transition state between U2 and Uφ. In this state, TφAL and TφPL are sent to the standby CP. This state is necessary to allow the standby CP to begin receiving timing levels at the beginning of a cycle when the SBYSF is reset.

If the Stop Standby Flip-Flop 89 is set by the MMC (gate 111) or MAC (gate 110), the standdby TGC will move from Uφ to U1 when AT7PL.X becomes true (i.e., a "1"). That is, Y2 goes to a "1," thereby forcing $\overline{Y2}$ to a "0" and disabling the gates of Switching Circuit 51 that are associated with the first six place and accept levels. T7AL and T7PL are sent to the standby CP during the transition from Uφ to U1, and while the TGC is in U1. However, TφAL and TφPL are not gated to the system in U1, so that as soon as AT7PL.X becomes "0," no timing levels reach the standby CP and the TGC goes to U2, where all timing levels are inhibited. The reason for the temporary state U1 is to prevent any part of TφPL or TφAL from reaching the CP while the TGC is moving to the stop standby state (U2). The inhibiting of the gates in the Switching Network thus occurs in two separate steps and the second step occurs in response to the timing signals received from the active TGC.

When the SBYSF 89 is reset by program control via gate 114 (the only way it can be reset), flip-flop 123 is reset and the TGC moves from U2 to U3 as soon as AT7PL.X comes true. When AT7PL.X becomes false, flip-flop 122 is reset thereby enabling the remainder of the gates 90, and TφAL and TφPL are sent to the standby CP and the TGC moves to Uφ. U3 is used to prevent any part of TφAL and TφPL being clipped when the standby TGC begins sending timing levels.

It will be observed that the Stop Standby Control in the active CP always resides in state U2 (forced by CPAL signal fed to gates 121, 124) which inhibits the gating of the ATφPL.X through AT7AL.X from the standby unit. This is a safeguard that if, due to a fault, the standby CP's Activity Control fails to inhibit the transmission of its timing levels, these levels will not be logically "ored" with the levels produced by the active CP's Level Generator in the active CP's Switching Network. Another advantage of having the active CP to be in state U2 is that it prevents any timing levels from reaching the new standby CP during a CP switch. Since the TGC is in U2 and the SBYSF 89 becomes set during the CP switch the TGC remains in U2 and no timing levels reach the standby CP.

DIAGNOSTIC CONTROL

In the standby CP each timing level can be controlled by MAC through the Diagnostic Control in the TGC. That is, the level may be selectively set either to a "1" or a "0" for under program control for as long as is necessary to perform diagnostic routines. More details on how the MAC 30 addresses and transmits data under program control can be obtained from the second of the above-identified copending applications. The Diagnostic Control consists of 16 flip-flops designated 84: eight for the Accept levels (Timing Interval $\phi$ Accept Level Diagnostic Flip-flop (T$\phi$ADF)) and eight for the Place Levels (Timing Interval $\phi$) Place Level Diagnostic Flip-flop (T$\phi$PDF), . . . , Timing Interval 7 Place Level Diagnostic Flip-flop (T7PDF)). These flip-flops when set in the standby CP cause the timing interval associated with that flip-flop to be true. Each set lead on the flip-flop is controlled individually by MAC. Internal Maintenance Data Bus (IMDB) Bits B16–B23 is used for data bits to the T$\phi$-T7ADF (i.e., Accept Diagnostic Flip-Flops), and Bits B24–B31 are used respectively for the T$\phi$PDF–T7PDF (diagnostic place levels). The accept levels are addressed as a unit via gate 150 and the place levels are addressed by MAC via gate 151. There is a common reset by MAC) for the eight place Flip-flops and also a common reset for the eight Accept Flip-flops. In the active CP all 16 flip-flops are always reset by CPAL. Each of these 16 points can also be sensed via MAC, as illustrated.

Figure 23:
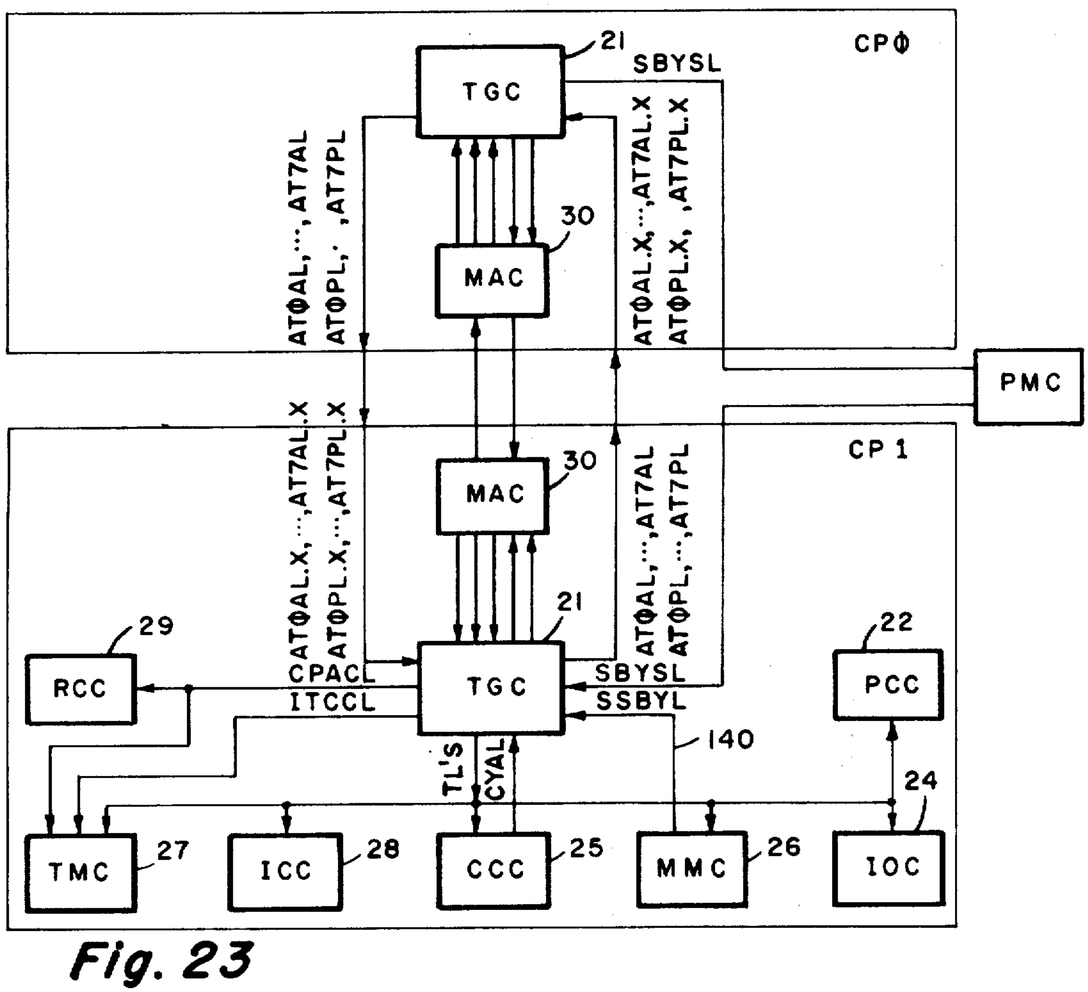
FIG. 23 is a functional block diagram of the Central Processors, showing the inputs and outputs of the Timing Generator Circuit.

Referring to FIG. 23, the MMC's Stop Standby Level (SSBYL) is cross-coupled via the Stop Standby Bus (SSBYB) 140 and is used to set the SBYSF in both the active and the standby CP. The set and reset controls from MAC are cross-coupled in the MAC itself.

HARDWARE — SOFTWARE INTERFACE

If the programmer wants to stop the standby CP from receiving timing levels (i.e., set the SBYSF), he must use the Write Maintenance Control Group (WMCG) instruction or Write Maintenance Control Point (WMCP) instruction and give bit $\phi$ at the address MCG4 value "1." To restart the standby CP (i.e., reset the SBYSF) the WMCG or WMCP instruction is used and bit 1 at the address MCG4 is given value "1." To read the SBYSF the Read Maintenance Sense Group (RMSB) instruction is used with the result appearing at bit $\phi$ of address MSG4.

It is important to note that the SBYSF can be reset only by program control and so, when this flip-flop is set (whether by program control or by MAC) the programmer must always reset it.

The control of the diagnostic flip-flop is provided with MSG7. To set or reset a flip-flop a WMCG or WMCP instruction is used. To read the flip-flops a RMSG instruction is used.

MAINTENANCE CONSIDERATIONS a. If a failure should ocur in the standby TGC, so that timing levels are sent from the standby TGC to the active TGC these levels will not reach the active CP because the active TGC will be in state U2 and this will inhibit these standby timing levels. However, these timing levels will reach the standby CP causing conflicting timing levels.

b. If the CP's both become active due to a fault or due to both trouble flip-flops being set, timing levels will be went to each CP from only its own Level Generator and these timing levels will be asynchronous.

INPUTS TO TGC

| SOURCE | MNEMONIC | DESCRIPTION |
|---|---|---|
| CCC | CPAL | Central Processor Activity Level (If true, the CP is active; if false, the CP is standby.) |
| MAC | SMG4L | Select Maintenance Group 4 Level |
| | SMG7L | Select Maintenance Group 7 Level |
| | IMDB.B$\phi\phi$ .B$\phi$1 .B14– .B31 | Internal Maintenance Data Bus Bits $\phi$, 1 and 14 through 31— controls TGC points during MAC write |
| MMC | SSBYL | Stop Standby Level (Sets SBYSF). |
| TGC.X | AT$\phi$AL.X | Active Timing Interval $\phi$ Accept Level (external) |
| | AT7AL.X | Active Timing Interval 7 Accept Level (external) |
| | AT$\phi$PL.X | Active Timing Interval $\phi$ Place Level (external) |
| | AT7PL.X | Active Timing Interval 7 Place Level (external) |
| SSBYB | SSBYB.B$\phi\phi$ (SSBYL) | Stop Standby Bus Bit $\phi$ (provides Cross-coupling for SSBYL). |
| PMC | SBYSL.ST | Standby Stopped Level-Signal. This level forces the SBYSF to be set in the CP. |
| | SBYSL.GT | Standby Stopped Level-Ggound. This is the ground wire for the twisted pair. |
| RCC | CPACL | Central Processor Activity Change Level (Notifies RCC that the CP's have switched.) |
| TMC | CPACL | Central Processor Activity Change Level (Initiaizes Timing Level Check Circuit in TMC of active CP.) |
| | ITCCL | Initiialize Timing Check Circuit Level (Initializes Timing Level Check Circuit in TMC of standby CP.) |
| TMC MMC PCC | T$\phi$AL . . . | Timing Interval $\phi$ Accept Level . . |
| | T7AL | Timing Interval 7 Accept Level |
| | T$\phi$PL . . | Timing Interval $\phi$ Place Level . . |

| | | |
|---|---|---|
| | T7PL | Timing Interval 7 Place Level |
| CCC | TϕAL | Timing Interval ϕ Accept Level |
| | T3AL | Timing Interval 3 Accept Level |
| IOC | TϕAL | Timing Interval ϕ Accept Level |
| | T3AL | Timing Interval 3 Accept Level |
| | T5AL | Timing Interval 5 Accept Level |
| | T7AL | Timing Interval 7 Accept Level |
| IOC | T3PL | Timing Interval 3 Place Level |
| | T4PL | Timing Interval 4 Place Level |
| | T5PL | Timing Interval 5 Place Level |
| ICC | TϕAL | Timing Interval ϕAccept Level |
| | T1AL | Timing Interval 1 Accept Level |
| | T7AL | Timing Interval 7 Accept Level |
| MAC | IMRB .Bϕϕ | Internal Maintenance Return Bus |
| | .B16– | Bit ϕ, Bit 16 through 31—when TGC points are sensed they are |
| | .B31 | gated onto this bus. |
| | T2PL | Timing Interval 2 Place Level |
| | T3PL | Timing Interval 3 Place Level |
| TGC X | ATϕAL | Active Timing Interval ϕ Accept Level |
| | . | . |
| | AT7AL | Active Timing Interval 7 Accept Level |
| | ATϕPL | Active Timing Interval ϕ Place Level |
| | . | . |
| | AT7PL | Active Timing Interval 7 Place Level |
| SSBYB | SSBYB.Bϕϕ (SSBYL) | Stop Standby Bus Bit ϕ (Provides cross-coupling for SSBYL). |
| DPC | T1AL | Timing Interval 1 Accept Level |
| | T3AL | Timing Interval 3 Accept Level |
| | T7AL | Timing Interval 7 Accept Level |

We claim:

1. In a data processing system having first and second central data processors each including processing circuits and maintenance circuits, said system being adapted wherein only one of said processors is active at one time and the other is standby as determined by a Central Processor Activity Level signal, the improvement comprising:

timing generator circuit means in each of said central processors, each timing generator circuit means including source means for generating a plurality of sequentially occurring timing level signals, a predetermined number of said sequential signals comprising a machine cycle;

first gate means receiving said timing level signals from said source means and adapted to transmit said signals to the outputs thereof in response to an enable signal;

activity control circuit means responsive to said Central Processor Activity Level signal and to the output signals of said source for generating an enable signal to said first gate means to transmit said timing level signals only when the associated central processor is active and only at the end of the last occurring timing level signal in a machine cycle when said central processors are switched;

switching network circuit means including a plurality of second gate circuit means receiving the output signals respectively of said first gate means, and a plurality of third gate means adapted to be enabled by a second enable signal and receiving respectively the timing signals from said first gate means in the other timing generator circuit means; and stop standby control circuit means responsive to predetermined Stop Standby signals for selectively inhibiting said third gate means in said switching network circuit means in timed relation with said received timing signals from said timing generator circuit means in the other central processor.

2. The system of claim 1 further comprising conductive means coupling the timing signals of each of said timing generator circuit means at the outputs of said first gate means to the respective inputs of said third gate means of the other timing generator circuit means, each timing generator circuit means being arranged such that when its associated central processor is standby, its activity control circuit means will prevent transmission of timing signals to the other central processor by inhibiting its associated first gate means.

3. The system of claim 1 wherein said timing level signals of said source include a plurality of sequential pulses occurring mutually exclusively, a predetermined number of said pulses comprising said machine cycle, and wherein said activity control circuit means comprises flip-flop circuit means capable of being in one of three states comprising states Sϕ, S1 and S2, said state Sϕ being a stable standby state, state S2 being a stable active state, and state S1 being a transition state, said activity control circuit means being responsive to the absence of said Central Processor Activity Level Signal to switch to said state Sϕ and to inhibit its associated first gate means, said activity control circuit means being further responsive when in said state Sϕ to said Central Processor Activity Level Signal and to one of said timing signals occurring at a predetermined time in a machine cycle to place said activity control circuit means in said state S1 for generating a Central Processor Activity Change Level internal of said Central Processor, said activity control circuit means being further responsive to said Central Processor Activity Level Signal and to the next occurring first timing level signal in a machine cycle when in said state S1 to assume said state S2 and for generating said enable signal to enable said first gate means, whereby said activity control circuit means controls the changing of its associated timing generator circuit means and insures that the timing level signals transmitted to said central processors start with the first-occurring timing level signal in a machine cycle when a central processor is made active.

4. The system of claim 2 wherein said timing level signals of said source include a plurality of sequential pulses occurring mutually exclusively, and wherein said stop standby control circuit means further comprises stop standby flip-flop circuit means responsive both to program signals and to machine generated signals for generating a Standby Stop Signal upon receipt of either of said machine-generated stop signals or said program stop signals, said stop standby control circuit means further including flip-flop circuit means capable of assuming four states comprising states U$\phi$, U1, U2 and U3, said stop standby control circuit means generating said enable pulse for said third gates of said switching network circuit means when in said state U$\phi$ whereby said third gate means will transmit timing level signals to its associated Central Processor from the timing generator circuit of the other Central Processor; said stop standby control circuit means being further responsive to said Stop Standby signal to assume said state U1 for inhibiting a portion of said third gate circuit means associated with the earlier occurring pulses in a machine cycle and being further responsive to the last occurring pulse in a machine cycle of the other Central Processor to switch to said state U2 to inhibit the remaining ones of said third gate circuit means, whereby the standby central processor is stopped only after the completion of a machine cycle.

5. The system of claim 4 wherein said stop standby control circuit means is responsive in said state U2 to the absence of said Stop Standby signal and the last occurring timing signal in a machine cycle received from the other Central Processor to assume said state U3 for enabling said first group of said third gate circuit means and being further responsive to the absence of said last-occurring timing pulse for generating said enable signal to the last group of said third gates in said switching network circuit means.

6. The system of claim 2 further comprising diagnostic flip-flop means associated with each of said timing level signals; and maintenance access circuit means for addressing preselected ones of said diagnostic flip-flop circuit means and for controlling the output thereof to a predetermined state for diagnostic purposes when the associated timing generator circuit is in the standby state.

7. In a data processing system having first and second central data processors each including processing circuits and maintenance circuits, said system being adapted wherein only one of said processors is active at one time and the other is standby as determined by a Central Processor Activity Level signal, the improvement comprising: timing generator circuit means in each of said Central Processors, each timing generator circuit means including source means for generating a plurality of sequentially occurring timing level signals, a predetermined number of said sequential signals comprising a machine cycle; first gate circuit means receiving said timing level signals from said source means and adapted to transmit said signals to the outputs thereof in response to an enable signal;

activity control circuit means responsive to said Central Processor Activity Level signal and to the output signals of said source for generating an enable signal to said first gate means to transmit said timing level signals only when the associated central processor is active and only at the end of the last occurring timing level signal in a machine cycle when said central processors are switched;

switching network circuit means including a plurality of second gate circuit means receiving the output signals respectively of said first gate circuit means, and a plurality of third gate circuit means adapted to be enabled by a second enable signal;

stop standby control circuit means responsive to predetermined Stop Standby signals for selectively inhibiting said third gate means in said switching network circuit means in timed relation with said received timing signals from said timing generator circuit means in the other central processor, said Stop Standby signal being generated both by program control and by circuitry within the associated central processor; and conductive means for connecting the output of each first gate means in one timing generator circuit means to the inputs of the respective third gate means in the other central processor, whereby the active timing generator circuit will drive both central processors, and the timing generator circuit in the standby central processor may be selectively inhibited to thereby stop the second central processor.

* * * * *